US012015130B2

(12) United States Patent
Silha et al.

(10) Patent No.: US 12,015,130 B2
(45) Date of Patent: *Jun. 18, 2024

(54) CHARGER AND CHARGER SYSTEM

(71) Applicant: MILWAUKEE ELECTRIC TOOL CORPORATION, Brookfield, WI (US)

(72) Inventors: Wyatt R. Silha, Milwaukee, WI (US); John G. Marx, Hartford, WI (US); Cameron R. Schulz, Milwaukee, WI (US); Samuel Sheeks, Germantown, WI (US); Joel D. Snyder, Menomonee Falls, WI (US); Jacob D. Rosenthal, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,350

(22) Filed: Apr. 27, 2023

(65) Prior Publication Data

US 2023/0261271 A1 Aug. 17, 2023

Related U.S. Application Data

(63) Continuation of application No. 17/110,456, filed on Dec. 3, 2020, now Pat. No. 11,670,808.
(Continued)

(51) Int. Cl.
*H01M 10/46* (2006.01)
*H01M 10/44* (2006.01)
(Continued)

(52) U.S. Cl.
CPC ..... *H01M 10/441* (2013.01); *H01M 10/6563* (2015.04); *H01M 50/20* (2021.01); *H02J 7/0013* (2013.01); *H02J 7/0044* (2013.01)

(58) Field of Classification Search
CPC ...... H02J 7/0013; H02J 7/0044; H02J 7/0042; H02J 7/00047; H02J 7/0047;
(Continued)

(56) References Cited

U.S. PATENT DOCUMENTS

| 6,057,608 A | 5/2000 | Bailey, Jr. et al. |
| 6,066,938 A | 5/2000 | Hyodo et al. |

(Continued)

FOREIGN PATENT DOCUMENTS

| CN | 202259465 U | 5/2012 |
| CN | 203369042 U | 12/2013 |

(Continued)

OTHER PUBLICATIONS

Companion, "⅜ in. (10 mm) Cordless Drill-Driver," Operator's Manual, © 2004 (21 pages).
(Continued)

*Primary Examiner* — Edward Tso
(74) *Attorney, Agent, or Firm* — Michael Best & Friedrich LLP

(57) ABSTRACT

A charger includes a housing with an interface positioned in a front wall and configured to engage a battery pack. The interface includes charging terminals positioned between a first rail and a second rail, a first groove positioned between the first rail and a wall of the housing, and a second groove positioned between the second rail and the wall of the housing. The interface is in communication with an interior of the housing. A fan is coupled within the housing adjacent the interface, and an air passage member includes a hollow body that has a first end coupled to the fan and a second end spaced apart from the first end extending through another wall of the housing. The fan is operable to suck an air flow into the housing from outside the housing and guide the air flow through the air passage member to the interface.

20 Claims, 24 Drawing Sheets

Related U.S. Application Data

(60) Provisional application No. 62/942,889, filed on Dec. 3, 2019.

(51) Int. Cl.
*H01M 10/6563* (2014.01)
*H01M 50/20* (2021.01)
*H02J 7/00* (2006.01)

(58) Field of Classification Search
CPC .......... H01M 10/441; H01M 10/6563; H01M 50/204; H01M 50/20
USPC ................... 320/107, 114, 116, 150, 153
See application file for complete search history.

(56) References Cited

U.S. PATENT DOCUMENTS

| | | | |
|---|---|---|---|
| 6,218,807 B1 | 4/2001 | Sakaue et al. |
| 6,339,312 B2 | 1/2002 | Sakaue et al. |
| 6,342,773 B2 | 1/2002 | Sakaue et al. |
| 6,433,509 B2 | 8/2002 | Kobayashi et al. |
| 6,455,186 B1 | 9/2002 | Moores, Jr. et al. |
| 6,537,694 B1 | 3/2003 | Sugiura et al. |
| 6,566,005 B1 | 5/2003 | Shimma et al. |
| 6,645,666 B1 | 11/2003 | Moores, Jr. et al. |
| 6,783,886 B1 | 8/2004 | Sakakibara et al. |
| 6,927,511 B2 | 8/2005 | Cleanthous et al. |
| 6,949,309 B2 | 9/2005 | Moores, Jr. et al. |
| 6,967,464 B2 | 11/2005 | Heigl et al. |
| 7,014,945 B2 | 3/2006 | Moores, Jr. et al. |
| 7,019,420 B2 | 3/2006 | Kogan et al. |
| 7,056,616 B2 | 6/2006 | Moores, Jr. et al. |
| 7,157,882 B2 | 1/2007 | Johnson et al. |
| 7,160,132 B2 | 1/2007 | Phillips et al. |
| 7,164,257 B2 | 1/2007 | Johnson et al. |
| 7,189,473 B2 | 3/2007 | Smith et al. |
| 7,199,553 B2 | 4/2007 | Kimoto |
| 7,211,347 B2 | 5/2007 | Sugiura et al. |
| 7,238,443 B2 | 7/2007 | Sakakibara |
| 7,252,904 B2 | 8/2007 | Moores, Jr. et al. |
| 7,253,585 B2 | 8/2007 | Johnson et al. |
| 7,270,910 B2 | 9/2007 | Yahnker et al. |
| 7,326,490 B2 | 2/2008 | Moores, Jr. et al. |
| 7,463,007 B2 | 12/2008 | Phillips et al. |
| 7,572,547 B2 | 8/2009 | Sakakibara |
| 7,589,493 B2 | 9/2009 | Satsuma |
| 7,602,146 B2 | 10/2009 | Carrier et al. |
| 7,692,408 B2 | 4/2010 | Miyazaki et al. |
| 7,709,137 B2 | 5/2010 | Shimizu |
| 7,723,952 B2 | 5/2010 | Phillips et al. |
| 7,733,054 B2 | 6/2010 | Phillips et al. |
| 7,736,792 B2 | 6/2010 | Moores, Jr. et al. |
| 7,879,483 B2 | 2/2011 | Sakakibara |
| 7,924,562 B2 | 4/2011 | Soma et al. |
| 7,939,193 B2 | 5/2011 | Moores, Jr. et al. |
| 7,952,326 B2 | 5/2011 | Johnson et al. |
| RE42,468 E | 6/2011 | Heigl et al. |
| 7,993,772 B2 | 8/2011 | Sakakibara |
| 8,097,354 B2 | 1/2012 | Sakakibara |
| 8,377,582 B2 | 2/2013 | Eom |
| 8,426,051 B2 | 4/2013 | Sakakibara |
| 8,741,467 B2 | 6/2014 | Sakakibara |
| 8,785,027 B2 | 7/2014 | Soong et al. |
| 8,929,068 B2 | 1/2015 | Richardson |
| 9,088,057 B2 | 7/2015 | Kim et al. |
| 9,225,184 B2 | 12/2015 | Rief |
| 9,669,534 B2 | 6/2017 | Okouchi et al. |
| 9,762,073 B2 | 9/2017 | Koch et al. |
| 9,917,452 B2 | 3/2018 | Kishima et al. |
| 10,103,558 B2 | 10/2018 | Teng et al. |
| 10,388,998 B2 | 8/2019 | Choi et al. |
| 10,547,186 B2 | 1/2020 | Namiki |
| 10,630,088 B2 | 4/2020 | Seidel et al. |
| 10,707,455 B2 | 7/2020 | Ogura et al. |
| 11,670,808 B2 * | 6/2023 | Silha ................ H02J 7/0013 320/134 |
| 2002/0197527 A1 | 12/2002 | Moores, Jr. et al. |
| 2006/0110656 A1 | 5/2006 | Moores et al. |
| 2007/0009787 A1 | 1/2007 | Straubel et al. |
| 2007/0072061 A1 | 3/2007 | Shimizu |
| 2007/0122692 A1 | 5/2007 | Smith et al. |
| 2008/0290836 A1 | 11/2008 | Tsai et al. |
| 2013/0149583 A1 | 6/2013 | Kurita |
| 2014/0197803 A1 | 7/2014 | Ishikawa |
| 2014/0248519 A1 | 9/2014 | Nishikawa et al. |
| 2015/0010802 A1 | 1/2015 | Inoue |
| 2015/0303531 A1 | 10/2015 | Willgert et al. |
| 2015/0303717 A1 | 10/2015 | Schneider et al. |
| 2017/0331302 A1 | 11/2017 | Namiki |
| 2019/0372365 A1 | 12/2019 | Qin et al. |

FOREIGN PATENT DOCUMENTS

| | | |
|---|---|---|
| CN | 207098644 U | 3/2018 |
| CN | 108173319 A | 6/2018 |
| CN | 110880630 A | 3/2020 |
| CN | 211456714 U | 9/2020 |
| DE | 102004020147 B4 | 11/2007 |
| DE | 102010039363 A1 | 2/2012 |
| DE | 102017211205 A1 | 1/2019 |
| EP | 1475876 A1 | 11/2004 |
| EP | 3327888 A1 | 5/2018 |
| EP | 3404795 A1 | 11/2018 |
| JP | H11122829 A | 4/1999 |
| JP | 2006128007 A | 5/2006 |
| WO | 2005027241 A2 | 3/2005 |
| WO | 2010013839 A1 | 2/2010 |
| WO | 2013027599 A1 | 2/2013 |
| WO | 2014030339 A2 | 2/2014 |
| WO | 2015075914 A1 | 5/2015 |
| WO | 2017208710 A1 | 12/2017 |
| WO | 2018192296 A1 | 10/2018 |
| WO | 2019112578 A1 | 6/2019 |
| WO | 2019136869 A1 | 7/2019 |

OTHER PUBLICATIONS

Ryobi, "18 Volt Right Angle Drill P240," Operator's Manual, © 2005 (18 pages).
International Search Report and Written Opinion for Application No. PCT/US2020/062975 dated Mar. 17, 2021 (11 pages).
Examination Report No. 1 issued by the Australian Government for Application No. 2020395173 dated Jan. 6, 2023 (4 pages).
Japanese Patent Office Action for Application No. 2022-529959 dated Jul. 25, 2023 (8 pages including machine English translation).
Extended European Search Report for Application No. 20895043.6 dated Mar. 4, 2024 (6 pages).

* cited by examiner

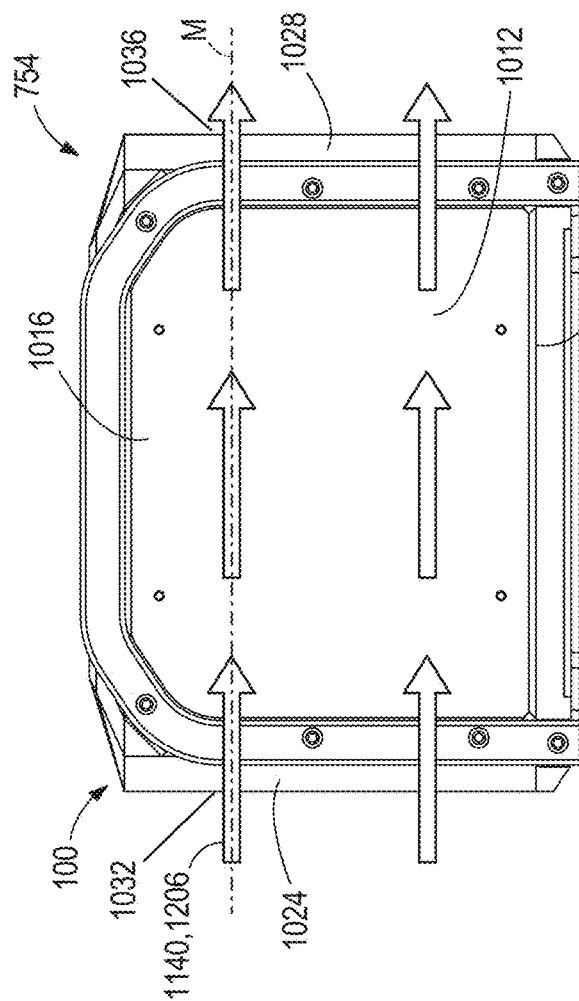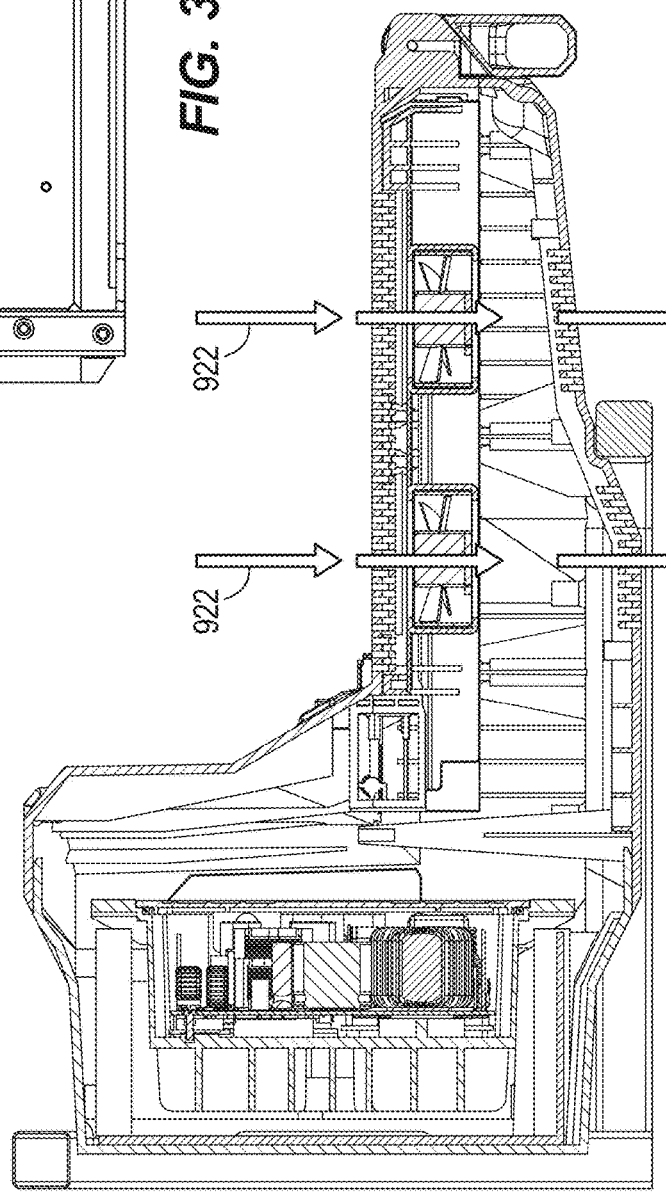

CHARGER AND CHARGER SYSTEM

CROSS-REFERENCE TO RELATED APPLICATIONS

This application claims the benefit of prior-filed, co-pending U.S. patent application Ser. No. 17/110,456, filed on Dec. 3, 2020, which claims priority to U.S. Provisional Patent Application No. 62/942,889, filed on Dec. 3, 2019, the entire contents of each of which is incorporated by reference herein.

BACKGROUND

The present utility model relates to battery packs and chargers for charging battery packs.

A typical battery charger includes a battery charging circuit that is connectable to a power source and to a rechargeable battery and that is operable to charge the battery.

SUMMARY

In one independent construction, a charger a housing includes a front wall, a rear wall, a top wall, a bottom wall, a first side wall, and a second side wall. An interface is positioned in the front wall and configured to engage a battery pack. The interface includes charging terminals positioned between a first rail and a second rail, a first groove positioned between the first rail and a wall of the housing, and a second groove positioned between the second rail and the wall of the housing. The interface is in communication with an interior of the housing. A fan is coupled within the housing adjacent the interface, and an air passage member includes a hollow body that has a first end and a second end spaced apart from the first end. The first end is coupled to the fan and the second end extends through one of the walls. The fan is operable to suck an air flow into the housing from outside the housing and guide the air flow through the air passage member to the interface.

In another construction, a charging system includes a charger housing having a front wall, a rear wall, a top wall, a bottom wall, a first side wall, and a second side wall. The charger housing has a first connection interface positioned in the front wall, and the interface includes charging terminals positioned between a first rail and a second rail, a first groove positioned between the first rail and a wall of the housing, and a second groove positioned between the second rail and the wall of the charger housing. Each of the first rail and the second rail include an aperture extending therethrough. A fan is coupled within the housing adjacent the first connection interface. An air passage member includes a hollow body that has a first end and a second end spaced apart from the first end, the first end being coupled to the fan and the second end that extends through one of the walls. The charging system further includes a battery pack having a battery housing that has a longitudinal axis, first portion, and a second portion coupled to the first portion. The battery housing is configured to enclose a plurality of battery cells, and a second connection interface extends from a wall of the first portion and is symmetrical about the longitudinal axis. The second connection interface includes battery terminals positioned between a first rail and a second rail, a first groove positioned between the first rail and a wall of the first portion, and a second groove positioned between the second rail and the wall of the first portion. A first plurality of vent holes extends through the wall in the first portion adjacent the first rail, and a second plurality of vent holes extends through the wall in the first portion adjacent the second rail. The second connection interface of the battery pack is coupleable to the first connection interface such that aperture in the first rail of the first connection interface is in communication with the first plurality of vent holes and the aperture in the second rail of the first connection interface is in communication with the second plurality of vent holes. The fan is operable to suck an air flow into the housing of the charger from outside the housing and guide the air flow through the air passage member to the apertures in each of the first and second rails and the first and second plurality of vent holes such that the air flow enters the battery pack housing.

In another construction, a charger for charging a battery pack having a housing enclosing a plurality of battery cells and one or more vent holes includes a housing including a battery pack receiving portion and a separate charger electronics portion. The charger electronics portion includes a charger electronics enclosure. The charger further includes a battery pack interface supported on the battery pack receiving portion, and the battery pack interface includes charging terminals. A first plurality of vent holes is positioned in a first outer wall of the battery pack receiving portion adjacent the battery pack interface. A first cooling air passage extends though the battery pack receiving portion from the first plurality of vent holes to an opening in a second outer wall of the battery pack receiving portion, and a first fan is positioned in the battery pack receiving portion adjacent the first plurality of vent holes and is operable to move air from outside of the battery pack receiving portion into the first cooling air passage via the first plurality of vent holes. The charger further includes a printed circuit board including electrical components in electrical communication with the charging terminals. The printed circuit board is enclosed within charger electronics enclosure. A second plurality of vent holes is positioned in a third outer wall of the charger electronics portion. A second cooling air passage extends through the charger electronics portion from the second plurality of vent holes to an opening in a fourth outer wall of the charger electronics portion, and the second cooling air passage is in fluid communication with the charger electronics enclosure for removing heat generated by the electrical components and sealed from the first cooling air passage. A second fan is positioned in the charger electronics portion outside the charger electronics enclosure adjacent the second plurality of vent holes and operable to move air from outside charger electronics portion into the second cooling air passage via the second plurality of vent holes.

Other independent aspects of the utility model will become apparent by consideration of the detailed description and accompanying drawings.

BRIEF DESCRIPTION OF THE DRAWINGS

FIG. 30 is a side view of the battery charger of FIG. 19 illustrating a first set of cooling air passages.

FIG. 31 is a rear view of the battery charger of FIG. 19 illustrating a second set of cooling air passages through the charger electronics housing of either FIGS. 28 and 29.

DETAILED DESCRIPTION

Before any independent constructions of the utility model are explained in detail, it is to be understood that the utility model is not limited in its application to the details of construction and the arrangement of components set forth in the following description or illustrated in the following drawings. The utility model is capable of other independent constructions and of being practiced or of being carried out in various ways.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

FIGS. 1-5 illustrates a charging system according to a first construction and including a battery charger 10 operable to charge a battery pack 14A, 14B (FIGS. 13-15) coupled to the charger 10. In the illustrated construction, the battery charger 10 is operable to charge a first battery pack 14A (FIG. 13) of a first type and a second battery pack 14B (FIGS. 14A-15) of a second type. The illustrated battery charger 10 may be operable to charge a high output battery pack (e.g., having a current capacity of 12 amp-hours (Ah) or more), which requires about 3 times the power of typical chargers, in about 60 minutes.

Figure 13:
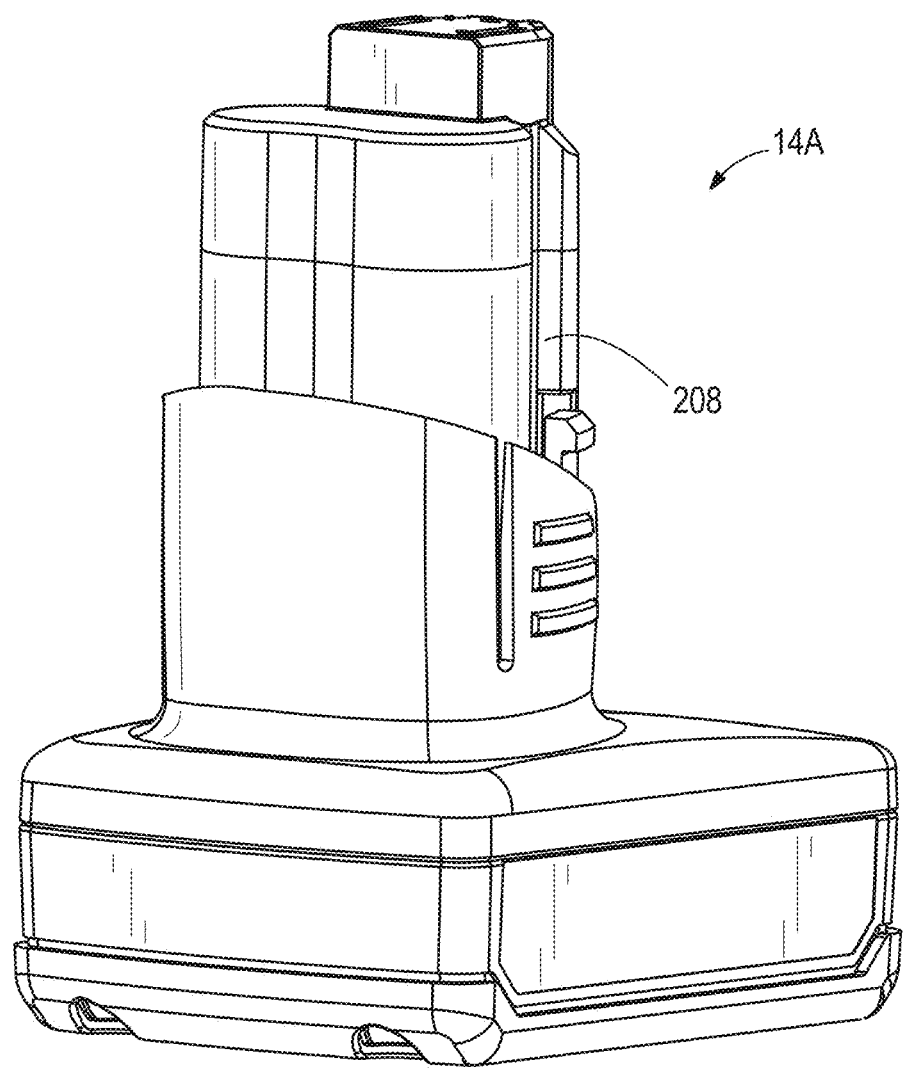
FIG. 13 is a perspective view of a battery pack of a first type.
Figure 14A:
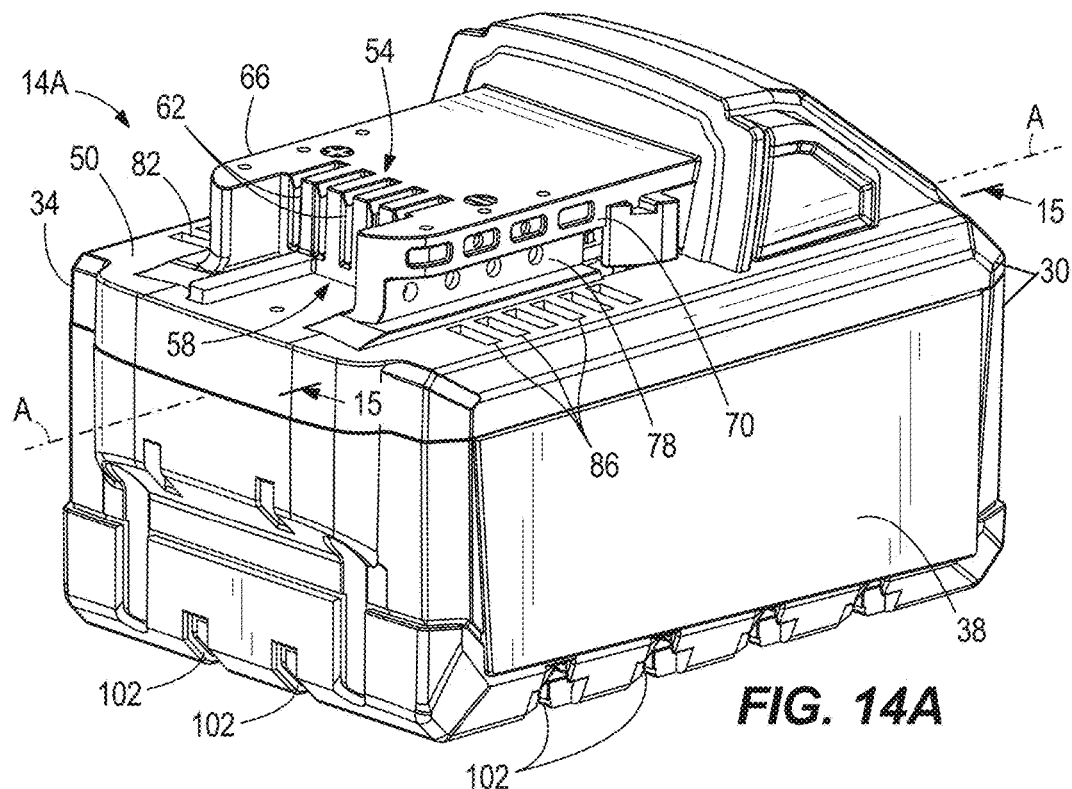
FIG. 14A is a rear perspective view of a battery pack of a second type.
Figure 14B:
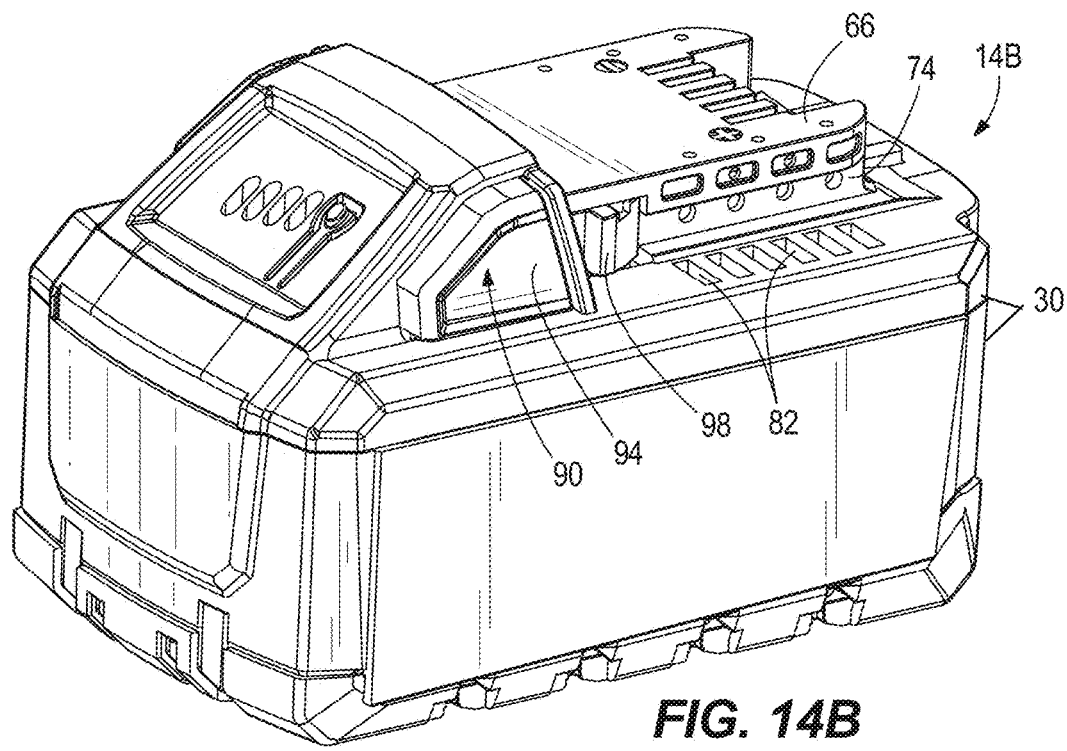
FIG. 14B is a front perspective view of a battery pack of FIG. 14A.
Figure 15:
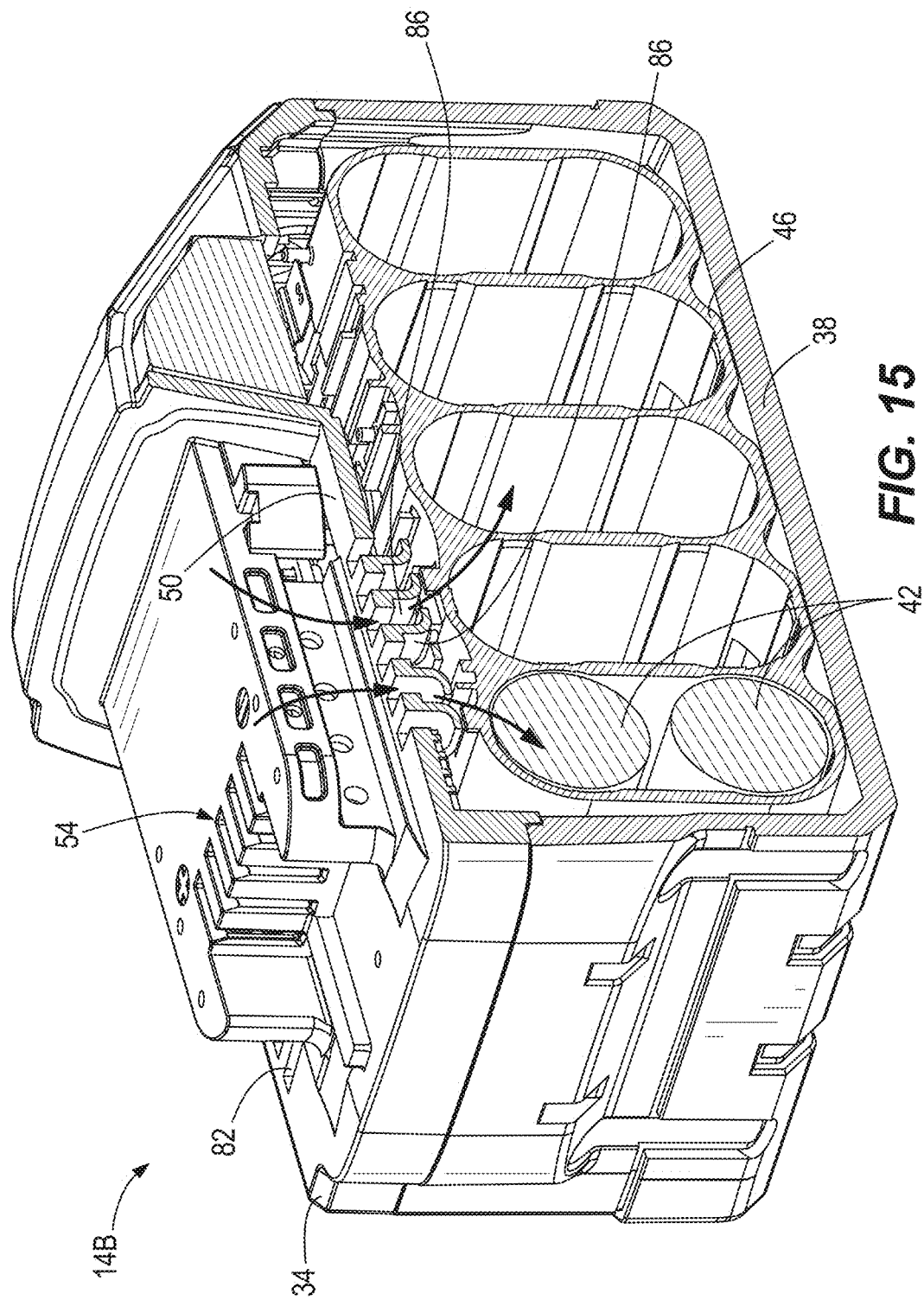
FIG. 15 is a cross-sectional view of the battery pack of FIGS. 14A-14B along the line 15-15 of FIG. 14A.

With reference to FIGS. 13-15, the battery pack type may be defined by nominal voltage, current capacity, connection configuration (e.g., "tower" vs. "slide-on"), etc., of the battery pack 14A, 14B. For example, the first battery pack 14A may include a high-power battery pack with a nominal voltage of about 12 volts (V) and having a tower-style configuration, and the second battery pack 14B may include a high-power battery pack with a nominal voltage of 18V and a slide-on configuration. In other constructions (not shown), the battery packs 14A, 14B may be the same type of battery pack.

As shown in FIGS. 14A-15, the battery pack 14B may include a battery pack housing 30 including a longitudinal axis A, a first (e.g., top) portion 34, and a second (e.g., bottom) portion 38 that are coupled to the first portion 34. The housing 30 encloses a plurality of battery cells 42 that are secured within an interior of the housing by a battery holder 46 (FIG. 15). The housing 30 also encloses battery pack circuitry (not shown). The first portion 34 is symmetrical about the longitudinal axis A, engageable with the charger 18, and includes a wall 50 and a battery pack interface 54 that extends from the wall 50. The battery pack interface 54 includes a terminal block 58 with openings 62 extending therethrough that allow access to battery pack terminals (not shown) positioned within the housing 30. On opposite sides of the battery pack interface 54 are rails 66, 70 and grooves 74, 78 that are defined between the respective rail 66, 70 and the wall 50. A first plurality of vent holes 82 and a second plurality of vent holes 86 extend through the wall 50 and are in communication with the interior of the battery pack 14B. The first plurality of vent holes 82 and the second plurality of vent holes 86 are positioned on opposite sides of the battery pack interface 54 and are adjacent to and parallel to the respective rails 66, 70 and grooves 74, 78. The battery pack 14B further includes a latch mechanism 90 including an actuator 94 and a latch member 98. In the illustrated construction, there are two latch mechanisms 90 on opposite sides of the first portion 34, but in other constructions there may be a single latch mechanism. The second portion 38 includes a plurality of holes 102 that allow communication between the interior of the battery pack 14B and outside of the battery pack 14B.

Each battery pack 14A, 14B is connectable to and operable to power various motorized power tools (e.g., a cut-off saw, a miter saw, a table saw, a core drill, an auger, a breaker, a demolition hammer, a compactor, a vibrator, a compressor, a drain cleaner, a welder, a cable tugger, a pump, etc.), outdoor tools (e.g., a chain saw, a string trimmer, a hedge trimmer, a blower, a lawn mower, etc.), other motorized devices (e.g., vehicles, utility carts, a material handling cart, etc.), and non-motorized electrical devices (e.g., a power supply, a light, an AC/DC adapter, a generator, etc.).

With renewed reference to FIG. 1-5, the charger 10 has a charger housing 100 including a front wall 110, a rear wall 114, a top wall 118, a bottom wall 122, a first side wall 126, and a second side wall 130. The front wall 114 includes a first portion 134 and a second portion 138 that is inclined relative to the first portion 134. The first and the second side walls 126, 130 are spaced apart from one another, and a transverse axis B of the charger housing 100 is defined therebetween. As shown, the charger housing 100 has a top portion 142 (FIG. 2) and an opposite bottom portion 146 coupled to the top portion 142 (e.g., by fasteners (not shown)). The housing portions 142, 146 may be formed of plastic with each molded as a single piece. In other constructions, the housing 100 may include other housing configurations (e.g., a clamshell housing, etc.). A power input port 150 for connection to a power supply (e.g., through a power cord, not shown) is positioned in the housing 100. In the illustrated construction, the power input port 150 is positioned in the front wall, but in other constructions the power input port 150 may be positioned at any suitable location on the housing.

Figure 7:
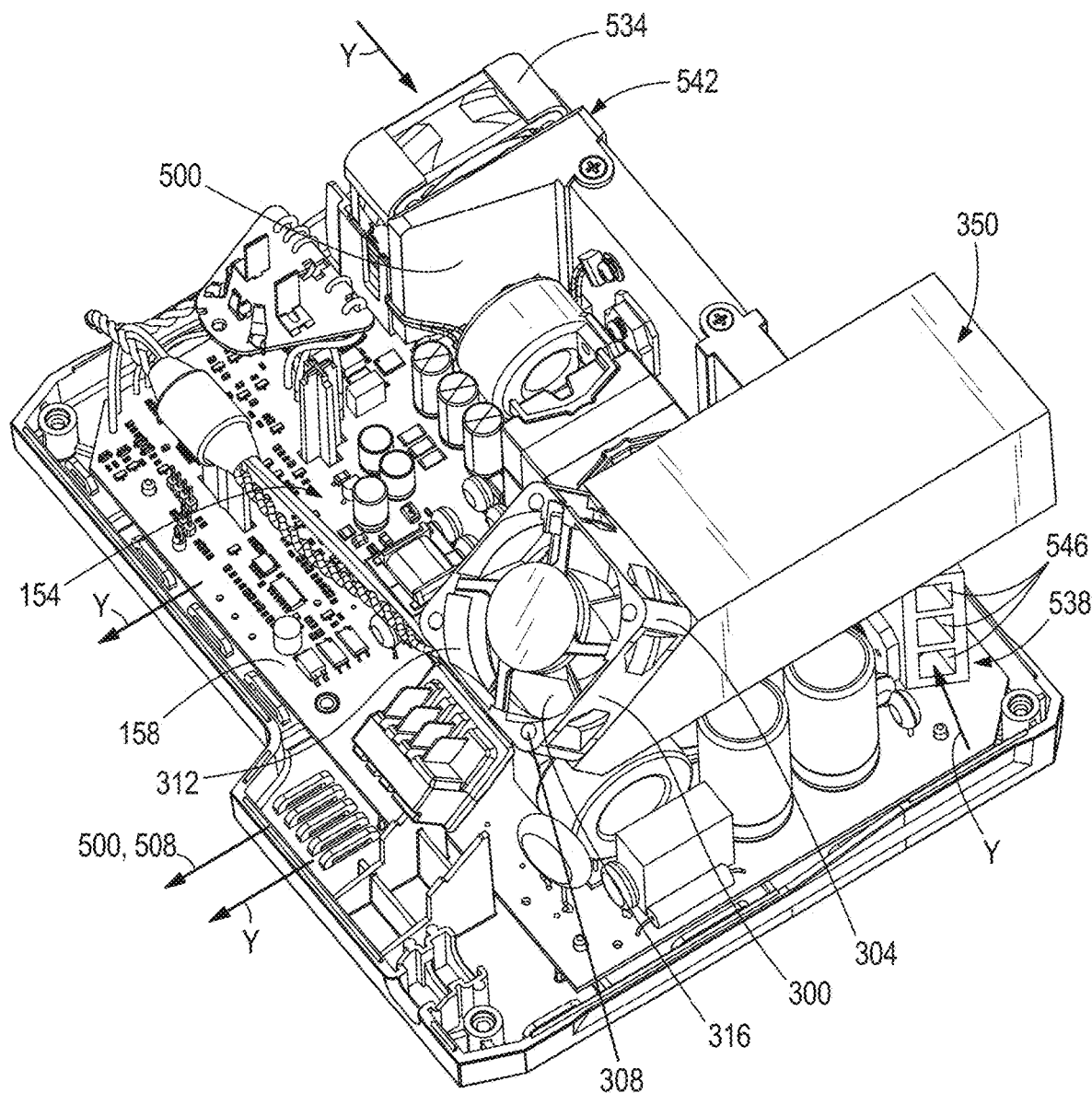
FIG. 7 is a top perspective view of the charger of FIG. 1, with portions of the housing removed and showing an air passage.
Figure 8:
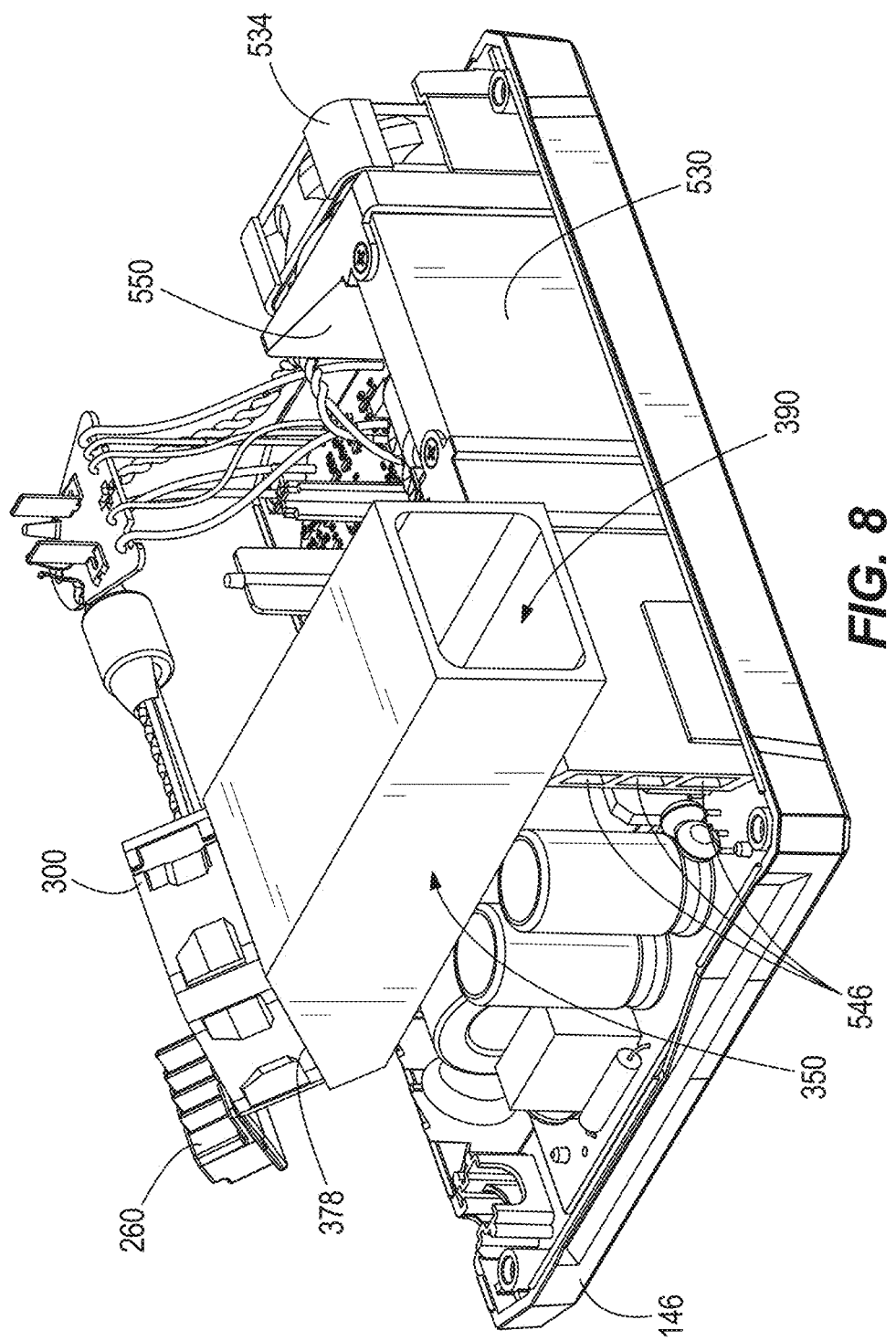
FIG. 8 is another top perspective view of the charger of FIG. 1, with portions of the housing removed and showing an air passage and a fan.

With reference to FIGS. 7-8, charger electronics 154 are supported by the bottom portion 146 and specifically the bottom wall 122. The charger electronics 154 are operable to output a charging current to one or both of the battery packs 14A, 14B to charge the battery packs 14A, 14B. The charger electronics 154 include, among other things, a printed circuit board (PCB) 158 and a charger microcontroller (not shown). The charger electronics 154 may include a charging circuit portion (not shown; e.g., on separate PCBs) for each of the battery packs 14A, 14B so that each battery pack 14A, 14B may be charged simultaneously and independently. The charging current provided to each battery pack 14A, 14B may be the same or different.

The charger housing 100 further includes charger interfaces 200A, 200B that are engageable with and support the respective battery packs 14A, 14B. Each charger interface 200A, 200B is at least partially positioned substantially on the front wall of the housing (e.g., at least partially on the inclined portion 138).

With reference to FIGS. 1-3, 5 and 9, the charger interface 200A defines an insertion axis C (FIG. 9) and a recess 204 (e.g., a battery pack receiving port) defined by the top wall 118 and the inclined portion 138 of the front wall 110. The insertion axis C is perpendicular to the transverse axis B of the housing and at a non-perpendicular and non-parallel angle relative to the inclined portion 138 of the front wall 110. The recess 204 is configured to receive at least a portion (e.g., the tower 208, FIG. 13) of the battery pack 14A. A first set of charger terminals 212 (FIG. 3) extend from within the housing 100 through holes into the recess 204. The charger terminals 212 are configured to electrically connect to battery pack terminals (not shown) of the battery pack 14A received in the recess 204 for charging.

Figure 1:
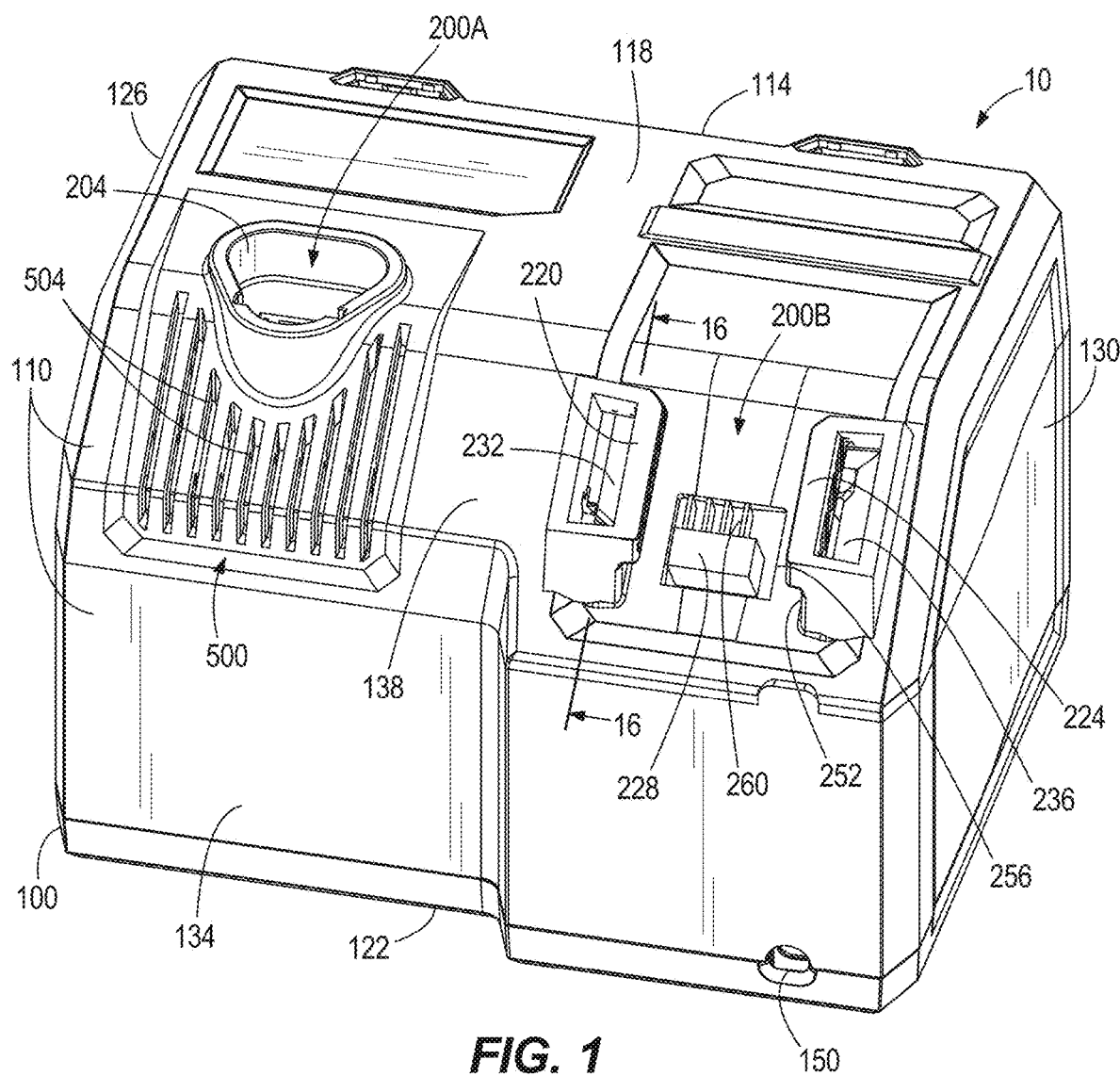
FIG. 1 is a perspective view of a battery charger according to a first construction.
Figure 2:
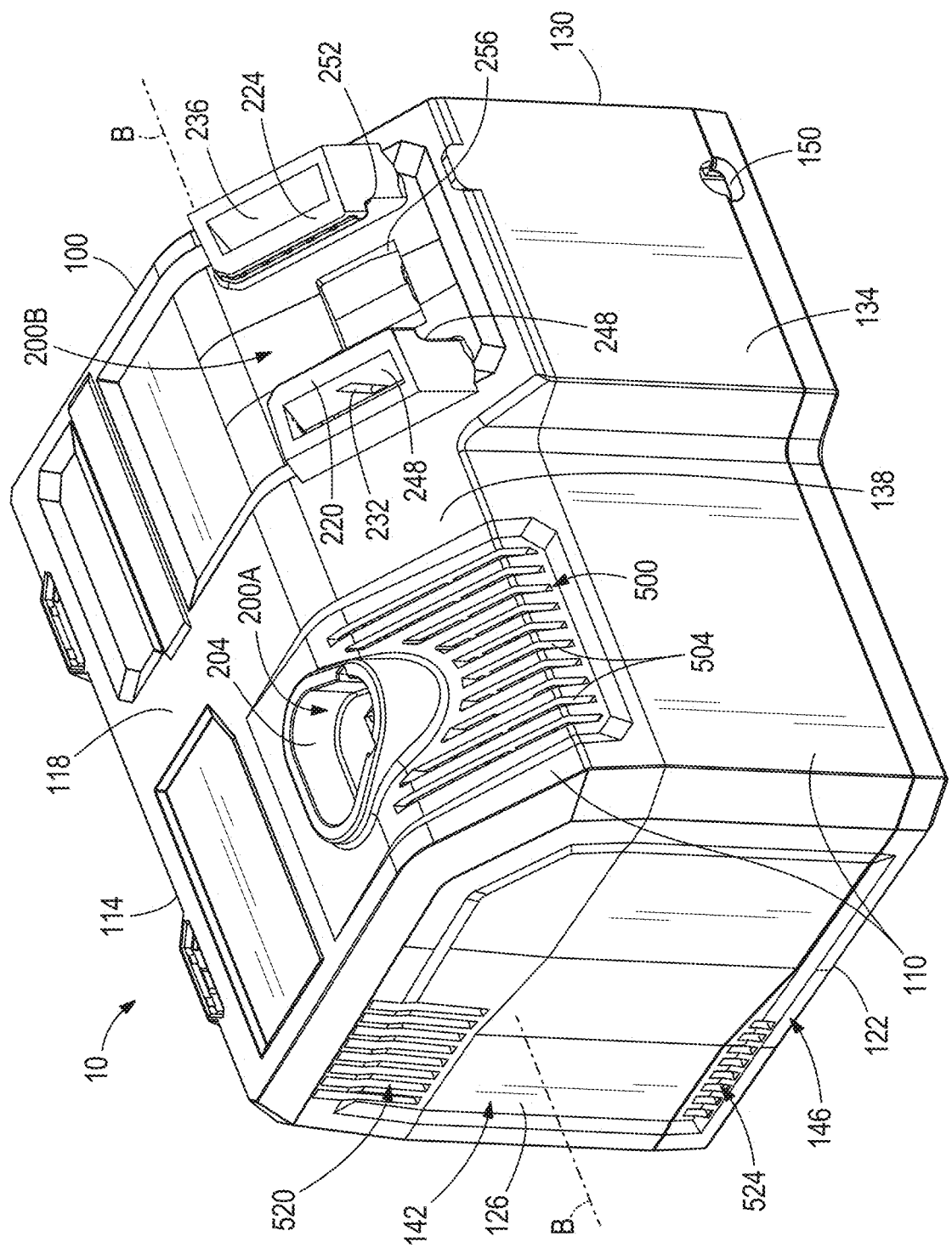
FIG. 2 is another perspective view the charger of FIG. 1.
Figure 3:
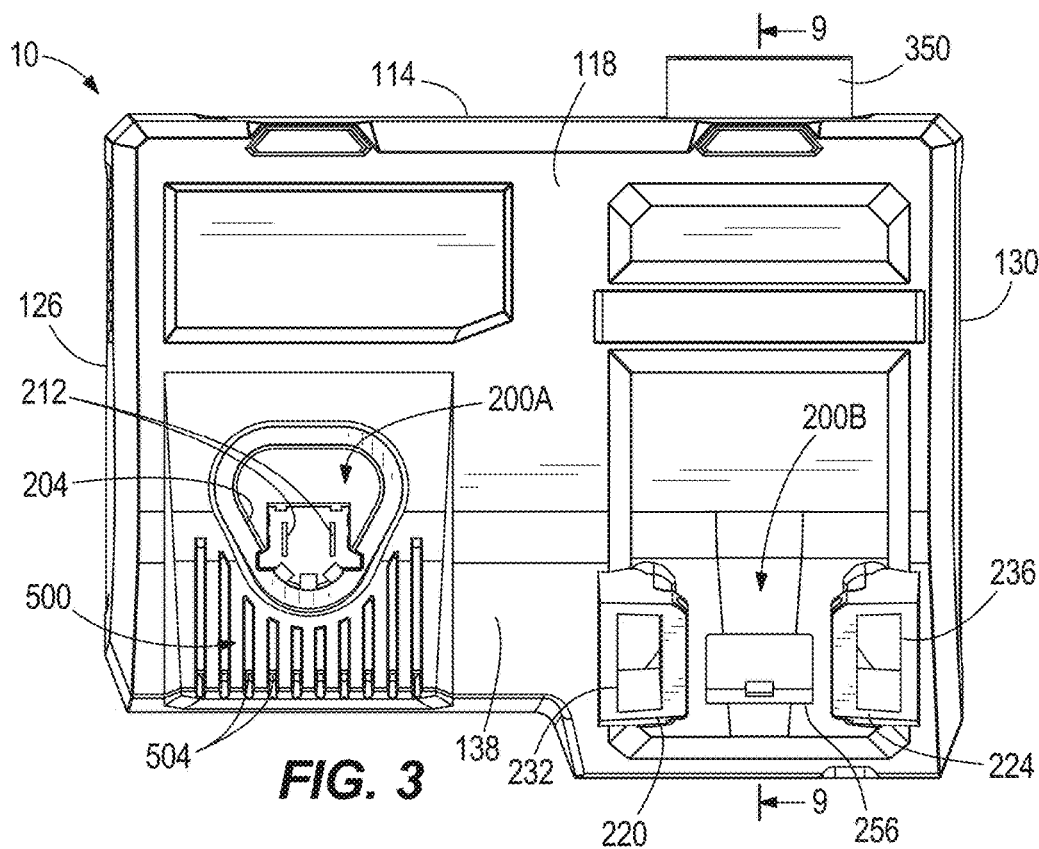
FIG. 3 is a top view of the charger of FIG. 1.
Figure 16:
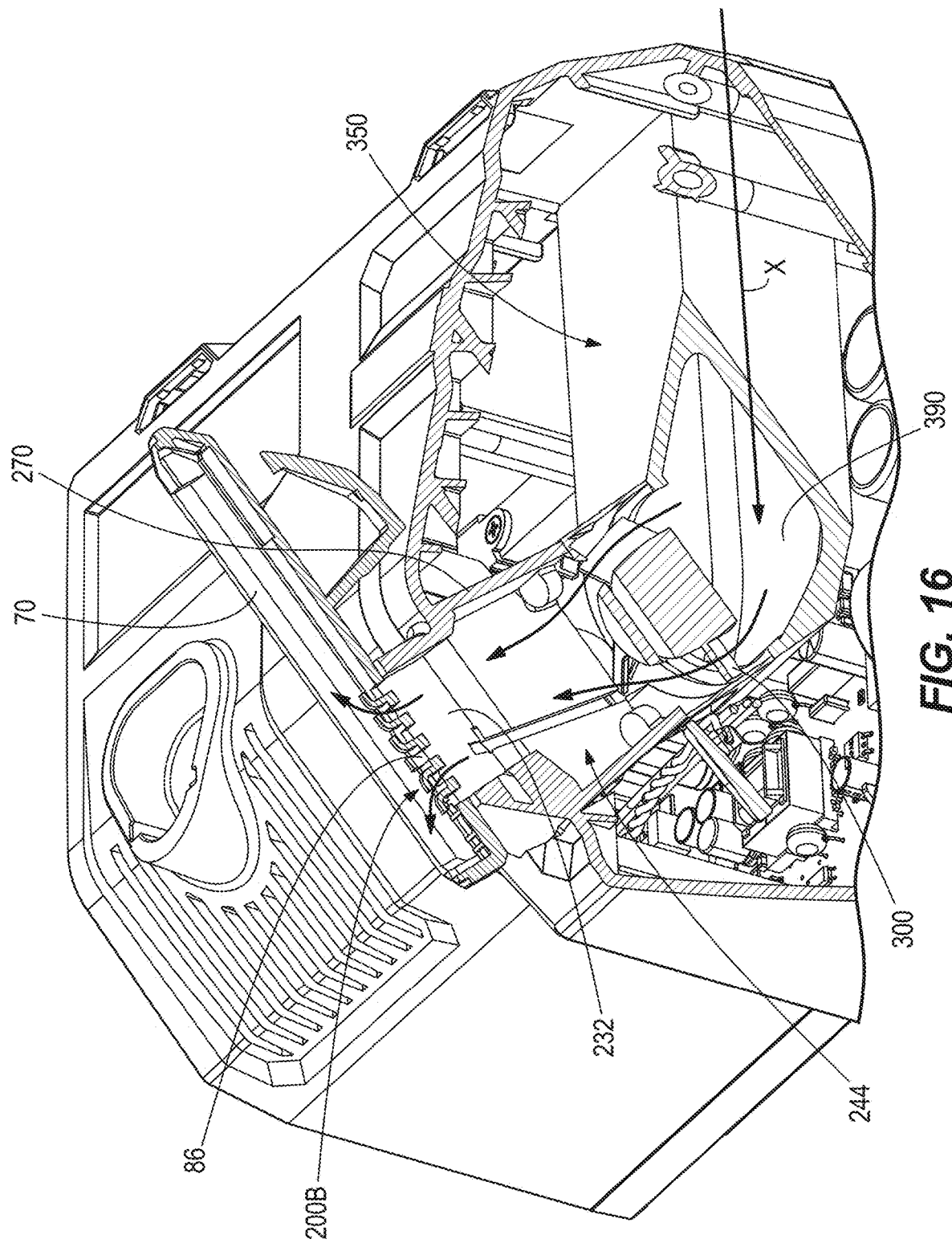
FIG. 16 is a cross-sectional view of the battery pack of FIG. 14A coupled to the charger of FIG. 1 along the line 16-16 of FIG. 1.

With reference to FIGS. 1-3, 5 and 9-10, the charger interface 200B defines an insertion axis D (FIG. 9) and includes rail members 220, 224 and a charger terminal block 228 (FIG. 1). The rail members 220, 224 are spaced apart, substantially parallel, and positioned on the inclined portion 138 of the front wall 110. An aperture 232, 236 extends through each of the rail members 220, 224. The apertures 232, 236 are each in communication with an interior 240 (FIG. 10) of the charger housing 100 via a first chamber 244 positioned within the housing 100. A groove 248, 252 is defined between the inclined portion 138 of the front wall 110 and the associated rail member 220, 224. The insertion axis D is oriented differently than the insertion axis B. In particular, the insertion axis D is parallel to the rail members 220, 224. The rail members 220, 224 and grooves 248, 252 are engageable with respective grooves 74, 78 and rails 66, 70 on the battery pack 14B. The apertures 232, 236 in the rail members 220, 224 of the charger interface 200B are configured to align and communicate with the respective first plurality of vent holes 82 and second plurality of vent holes 86 in the wall 50 of the first portion 34 of the battery pack 14B (FIG. 16). The charger terminal block 228 is positioned within an aperture 256 in the inclined portion 138 and is positioned between the rail members 220, 224. The charger terminal block 228 includes a second set of charger terminals 260 (FIG. 1) configured to electrically connect to battery pack terminals of the battery pack 14B for charging.

Figure 6:
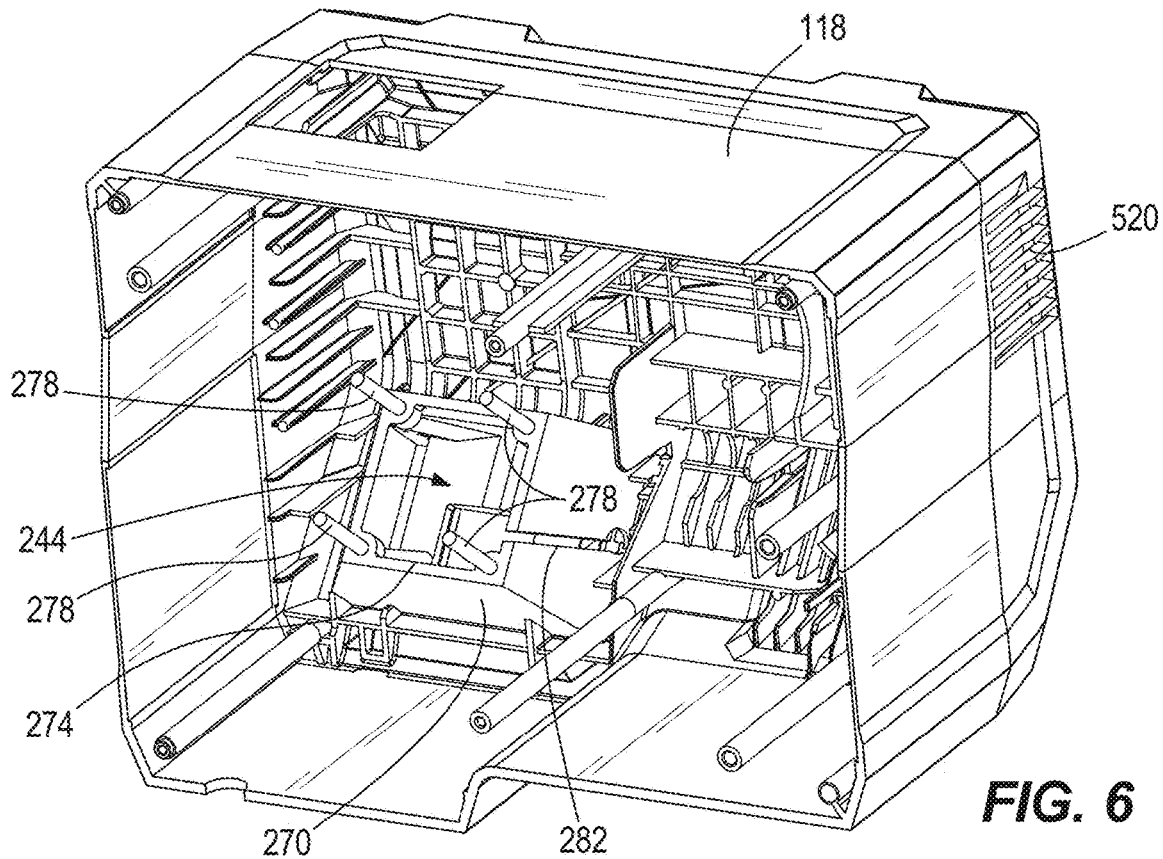
FIG. 6 is a bottom perspective view of a portion of a housing of the charger of FIG. 1.

With reference to at least FIG. 6, the first chamber 244 is defined by a first chamber wall 270 that extends from the inclined portion 138 of the front wall 110 into the charger housing 100. As shown in FIG. 6, the first chamber wall 270 defines a polygonal shaped aperture 274 and has posts 278 extending therefrom. The first chamber 244 defines an axis E (FIG. 9) that is perpendicular to the inclined portion 138 of the front wall 110. A slot 282 (FIG. 6) extends through the chamber 270.

As shown in FIG. 7-11, a first fan 300 or blower (e.g., a DC blower) is positioned adjacent to the first chamber 244. With respect to FIGS. 7, 8, and 11, the first fan 300 includes a fan housing 304 that is positioned adjacent and coupled to the first chamber wall 270. In particular, the fan housing 304 includes through-holes 308 (FIGS. 7 and 11) that receive the posts 278 extending from the chamber wall 270. An opening 312 of the fan housing 304 is aligned with the first chamber 244 (e.g., along the axis E), and one or more blades 316 are rotatably positioned therein. The first fan 300 is a multi-speed fan operable to rotate at more than one speed. The speed at which the fan 300 rotates may be determined based on a temperature of one or more of the charger electronics 154 or the battery pack 14B. In some constructions, at full speed, the first fan 300 generates an air flow of between about 13.6 m$^3$/hour and about 25.5 m$^3$/hour. Still further, in some constructions, the first fan 300 may generate an air flow of about 20.4 cubic feet per minute (CFM) and up to about 35 m$^3$/hour or less. In still other constructions, at full speed, the fan 300 may generate an air flow that is less than or greater than 31 CFM.

An air passage member 350 is positioned within the housing 100 and extends from the first fan 300 through an opening 354 (FIG. 9) in the rear wall 114. With respect to FIGS. 7, 8, 11, and 12, the air passage member 350 includes a hollow body 358 that has a first (e.g., top) wall 362, a second (e.g., bottom) wall 366 opposite the first wall 362, and a pair of side walls 370, 374 that are coupled on opposite sides of the first and second walls 362, 366 and extend therebetween. A first angled wall 378 is coupled to and extends from the first wall 362 and extends between the pair of side walls 370, 374. The first angled wall 378 is coupled to a second angled wall 382. The second angled wall 382 is coupled to and extends from the second wall 366, and extends between the pair of side walls 370, 374. An aperture 386 extends through the first angled wall 378 and is in communication with a second chamber 390 defined by the hollow body 358.

The air passage member 350, and therefore the second chamber 390, includes two axes F, H. One of the axes F passes through a center of the aperture 386 in the first angled wall 378 and is configured to be coincident with the axis E, and the other of the axes H extends between and parallel to the first and second walls 362, 366. The F, H are positioned at a non-perpendicular and non-parallel angle relative to one another. In the illustrated construction, the angle between axes F and H is oblique, and measures between 100 degrees and 150 degrees. A preferred angle between the axes F and H is 129 degrees. In other or additional embodiments, the angle between F and H may be perpendicular or acute. Moreover, the axis H is positioned at a non-perpendicular and non-parallel angle relative to the insertion axis D. In the illustrated construction, the angle between axes D and H is acute, and measures between 15 degrees and 60 degrees. A preferred angle between the axes D and H is 39 degrees. In other or additional embodiments, the angle between D and H may be perpendicular or oblique. The air passage may be constructed from plastic acrylonitrile butadiene styrene (ABS), polycarbonate acrylonitrile butadiene styrene (PC-ABS), and/or aluminum, although other suitable thermoplastic, thermoplastic polymers, and metals may also or alternatively be used.

As shown in FIGS. 9-12, the air passage member 350 is coupled to the first fan 300. In particular, the first angled wall 378 includes through-holes 394 that are aligned with the through-holes 308 in the fan housing 304 and receive the posts 278. Accordingly, the aperture 386 in the first inclined wall 378 is aligned with the opening 312 in the first fan 300 and the first chamber 244 and allows communication between the first chamber 244 and the second chamber 390. The axis F of the aperture 386 is coincident with the axis E of the first chamber 240, as discussed above, and the axis H is parallel to the bottom wall 122 of the housing 100. Also, the air passage member 350 has a length L that is more than 50% of the depth D1 of the housing 100. Preferably, the length L of the air passage member 350 ranges from 55% of the depth D1 of the housing to 75% of the depth D1 of the housing 100.

Figure 9:
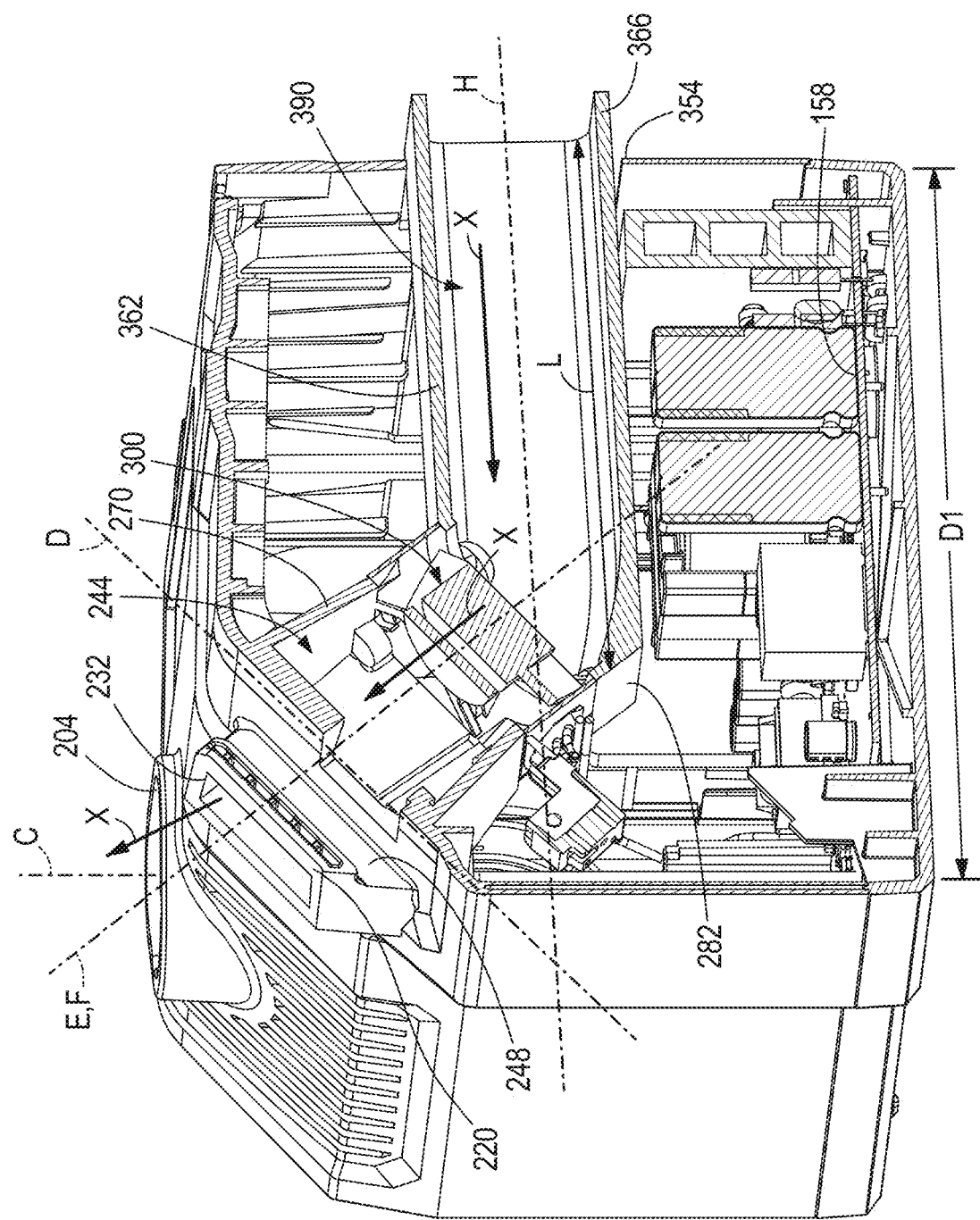
FIG. 9 is a cross-sectional view of the charger of FIG. 1 along the lines 9-9 of FIG. 3.
Figure 10:
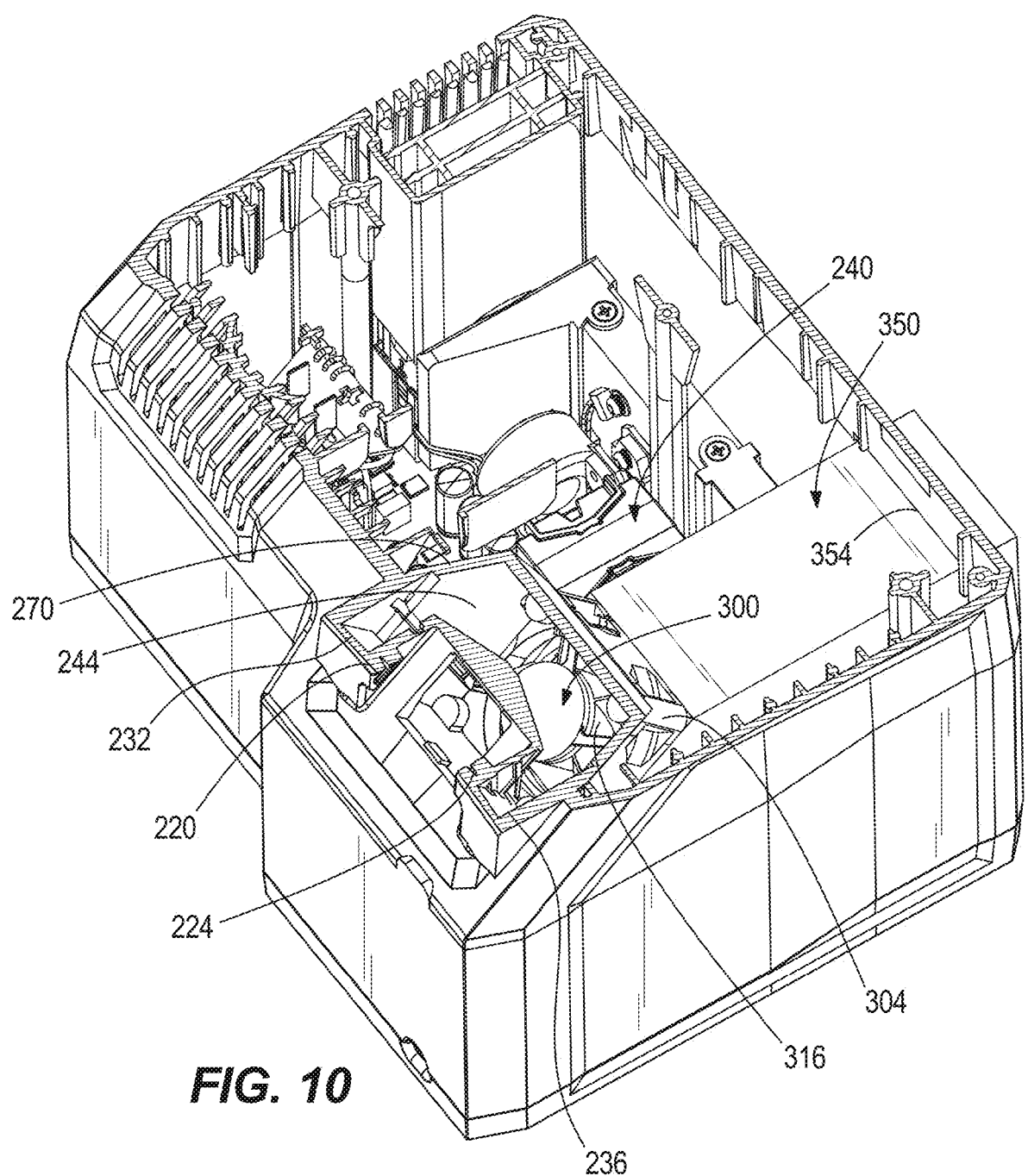
FIG. 10 is another cross-sectional view of the charger of FIG. 1 along the lines 10-10 of FIG. 5.
Figure 11:
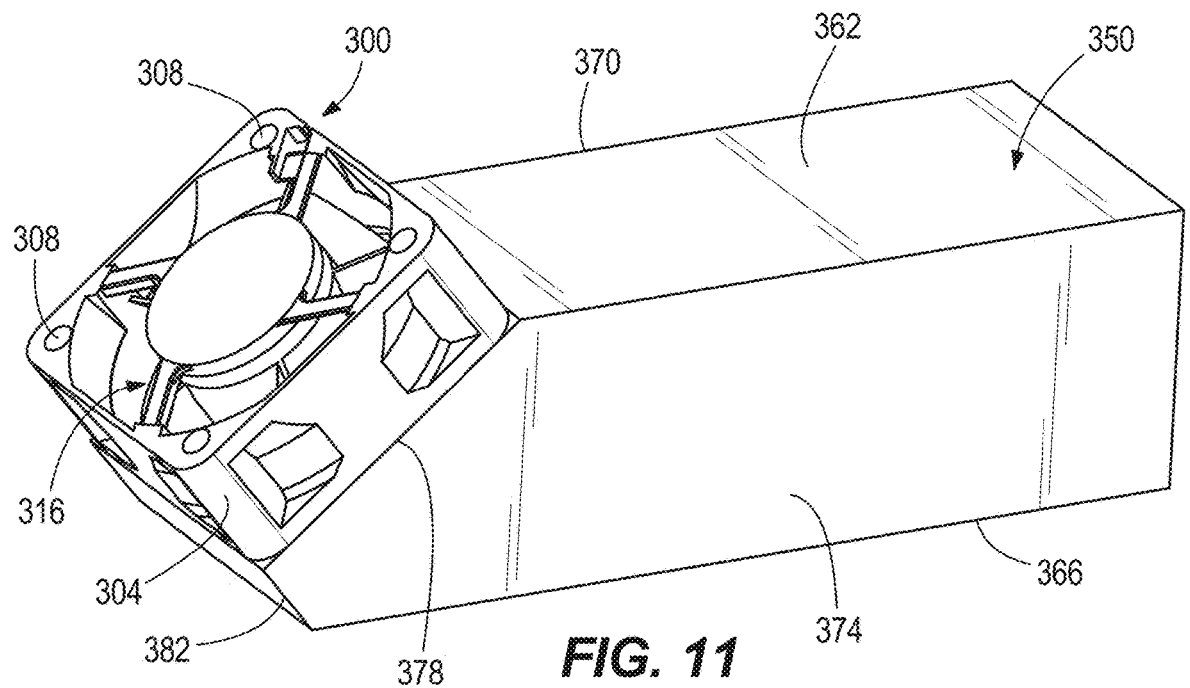
FIG. 11 is a perspective view of the air passage and the fan of FIGS. 7 and 8.
Figure 12:
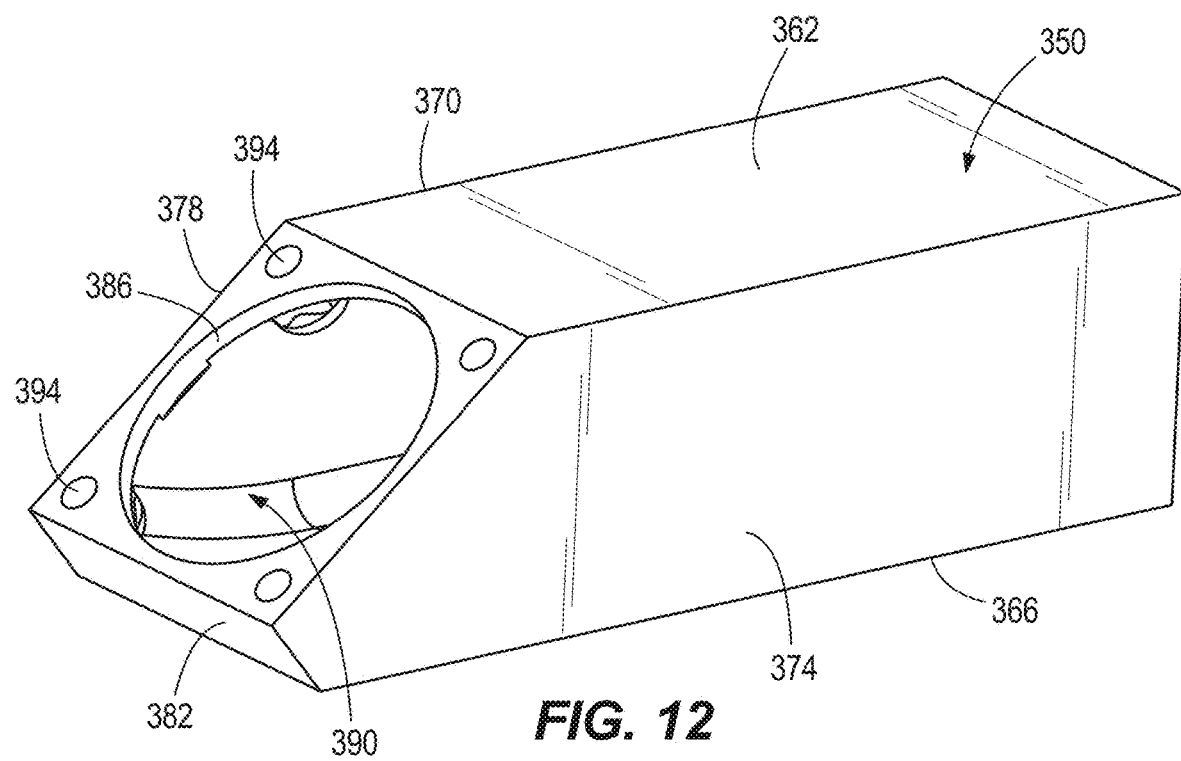
FIG. 12 is a perspective view of the air passage of FIGS. 7 and 8.

With reference to FIGS. 9 and 16, the first chamber 244, the opening 312 in the fan housing 304 and the second chamber 390 define a first air flow path or passage X that receives a first air flow X from outside the charger housing 100. A distal or protruding end 398 of the air passage member 350 extending from the housing 100 defines an air inlet and the apertures 232, 236 define the air outlet of the first air passage such that the first air flow X moves from outside the charger housing 100 to the battery pack 14B sequentially through the second chamber 390, the fan 300 and the first chamber 244. Therefore, when actuated, the fan 300 sucks air into the air passage such that the first air flow X travels from outside the charger housing 100 laterally (e.g., horizontally) through the second chamber 390 along the axis H and vertically through the fan 300 and first chamber 244 along the axes E, F. The first air flow X then enters the battery pack 14B via the apertures 232, 236 in the rails 220, 224 of the charger interface 200B and the first plurality of vent holes 82 and the second plurality of vent holes 86 in the first portion 34 of the battery pack 14B. Once within the battery pack housing 100 the first air flow X is guided from the respective plurality of vent holes 82, 86 between the battery cells 42 and the second portion 38 of the battery pack 14B towards the holes 102 in the second portion 38 of the battery pack 14B. Accordingly, the first air flow X may be used to cool the battery cells 42 during charging of the first battery pack 14B.

In other constructions, the distal or protruding end 398 may define the air outlet and the apertures 232, 236 may define the air inlet of the first air passage such that the first air flow X moves from the battery pack 14B to outside of the charger housing 100 sequentially through the first and second plurality of vent holes 82, 86, the first chamber 244, the fan 300, and second chamber 390. In such case, when actuated, the fan 300 sucks air into the air passage thereby generating a reverse air flow (e.g., airflow that moves in the reverse of the airflow X). Therefore, air travels from inside the battery pack vertically through the first chamber 244 and the fan 300 along the axes E, F and laterally (e.g., horizontally) through the second chamber 390 along the axis H. Accordingly, the first air flow X or the reverse airflow may be used to cool the battery cells 42 during charging of the first battery pack 14B.

In some constructions, air may be guided in a first direction (e.g., to the battery pack 54) through one air passage 350 and may be guided in a second direction (e.g., away from the battery pack 54) through another air passage. Moreover, one of the air passages may include a heating element or a cooling member that is in electrical communication with the charger electronics. A movable valve or seal selectively opens and closes one or both of the air passages. A similar, exemplary view of this construction is shown in FIG. 24C. The heating element or cooling member may be actuated to blow air that is higher (e.g., via the heating element) or lower (e.g., via the cooling element) than ambient air temperature into the battery pack 54 to respectively heat up the cells or cool the cells of the battery pack 54. The seal is movable between a first, closed position when the heating element or cooling element is not being used and a second, open position when the heating element or cooling element is being used. The heating element or cooling element and the seal may be manually actuatable by a user or automatically actuatable via the charger electronics (e.g., a controller and a temperature sensor). The other of the air passages may always open to suck or blow ambient air into battery pack 54 via charger 10, as discussed herein. In other constructions, the seal may alternatively open and close the air passages, depending on which is being used.

In other constructions, the air passage 350 may be divided into separate air passages thereby creating a dual-air passage member. In these constructions, air may be guided in a first direction (e.g., to the battery pack 54) through one of the dual-air passages and may be guided in a second direction (e.g., away from the battery pack 54) through the other of the due-air passages. Similarly, one of the dual-air passages may include the heating element or the cooling member that is in electrical communication with the charger electronics, such that air is guided through the dual-air passages, as discussed above and below with respect to FIG. 24C.

In other or additional constructions, the first chamber may be omitted. In such case, the housing may include posts extending therefrom that receive and support the fan 304 and the air passage member 350.

In still other constructions, the charger interface 200B may be positioned and supported by other walls of the housing 100. Similarly, the air passage member 350 may extend through an opening in another wall (e.g., the bottom wall 122 or one of the side walls 126, 130) of the housing 100. Accordingly, the air passage member 350 may include other suitable configurations such that the air passage member 350 may extend through and from other walls of the housing 100 to the apertures 232, 236 in the rails 220, 224 of the charger interface 200B.

Figure 17:
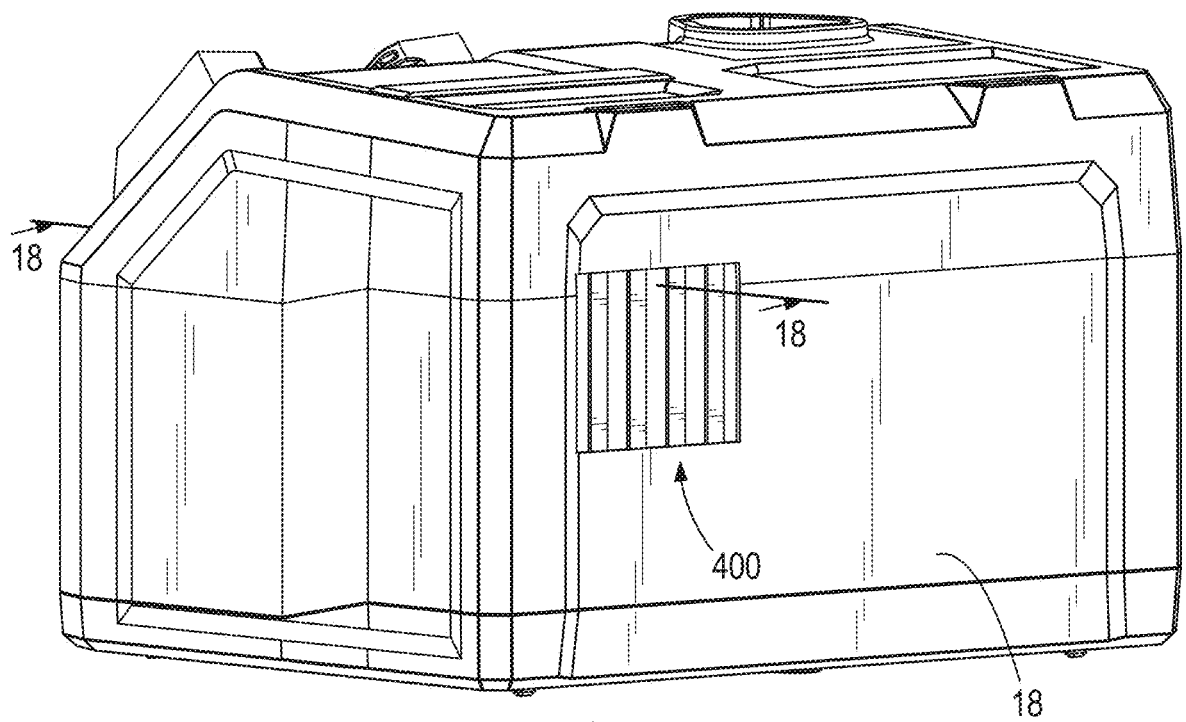
FIG. 17 is a perspective view of a battery charger according to another construction.
Figure 18:
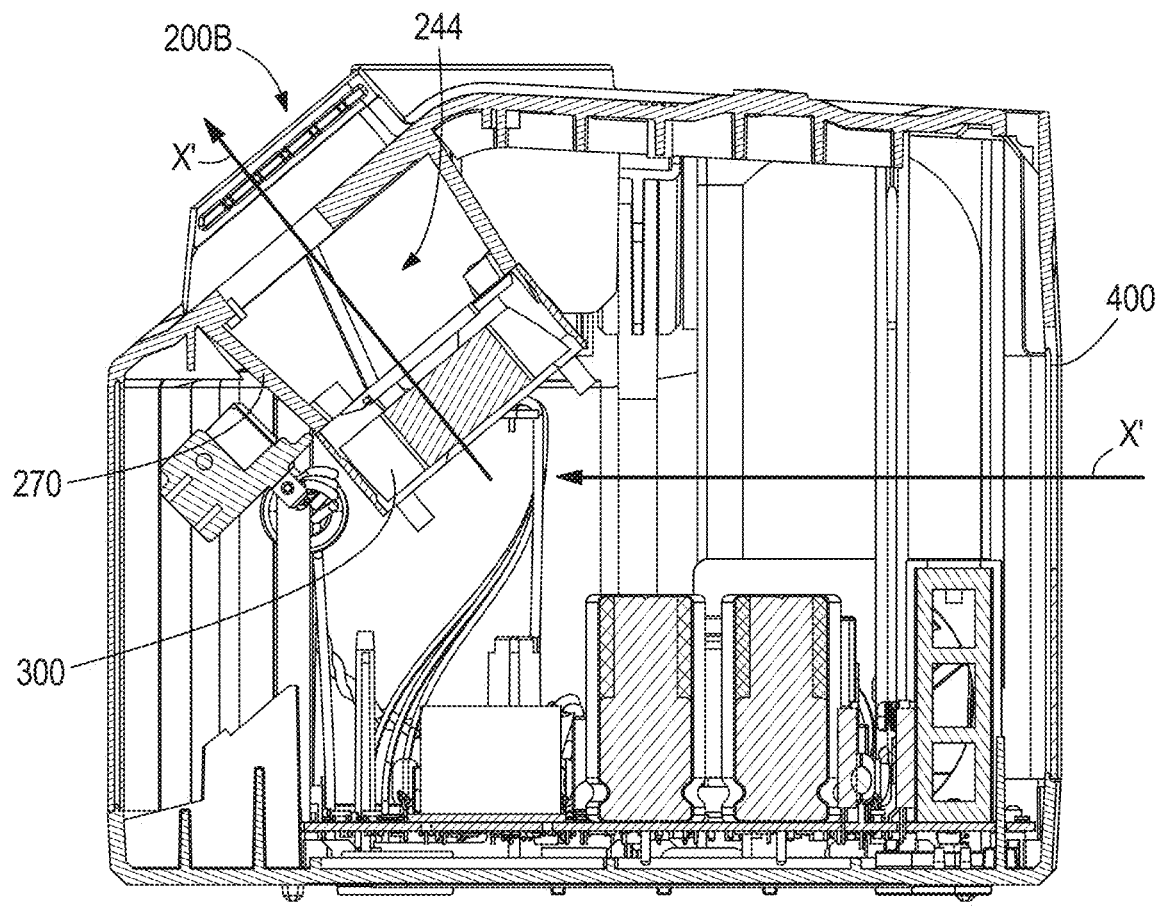
FIG. 18 a cross-sectional view of the battery charger along the line 18-18 of FIG. 17.

In still other or additional constructions (FIGS. 17 and 18), the air passage member 350 may be omitted and the aperture in the rear wall 114 replaced by vent holes or slots 400 (e.g., an air inlet). Moreover, there may be additional vent holes 400 in other walls as well, or the vent holes 400 may be placed in other walls of the housing (e.g., closer or further from the fan 300). Therefore, when actuated, the fan 300 sucks air into interior of the charger housing 100 (rather than the first air passage) such that the first air flow X' travels from outside the charger housing 100 laterally through the vent holes 400 to the fan 300 and into the first chamber 244 along the axes E, F. The first air flow X' then enters the battery pack 14B as discussed above with respect to the first airflow X. Alternatively, when actuated, the fan 300 sucks air into the the charger housing 100 (rather than the first air passage) such that the reverse air flow (e.g., airflow that moves in the reverse of airflow X') travels from the battery pack 14B into the outside the charger housing 100, into the first chamber 244 along the axes E, F to the fan 300, and laterally from the fan 300 through the vent holes 400.

With reference to FIGS. 1-4, the charger 10 may have other or auxiliary air passages that extend between other an air inlets and outlets in the housing 100. For example, the housing 100 also defines air inlets 520, 524 (FIG. 2) positioned in the side wall 126 of the housing 100 and proximate the rear wall 114. The inlets 520, 524 include slots 528, 532 extending through the side wall 126. In other constructions (not shown), the slots 520, 524 may extend in a latitudinal direction, a combination longitudinal/latitudinal direction, etc. The slots 528, 532 are configured to facilitate air flow entering the housing 100.

Figure 4:
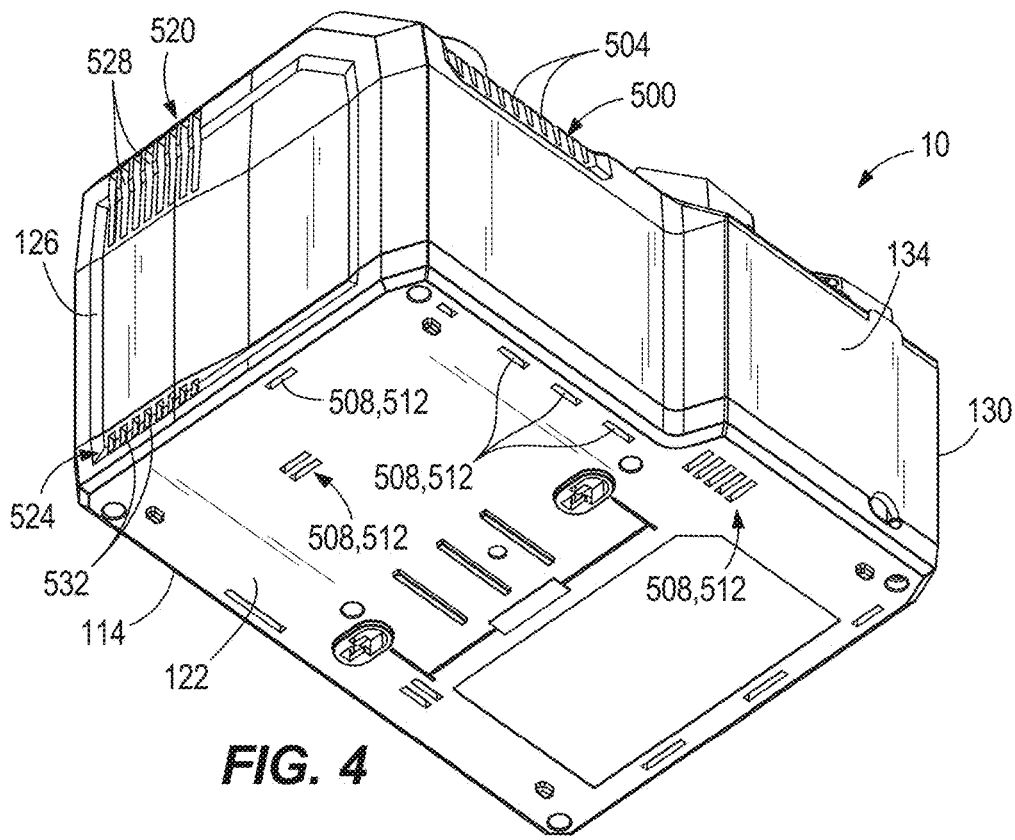
FIG. 4 is a bottom perspective of the charger of FIG. 1.
Figure 5:
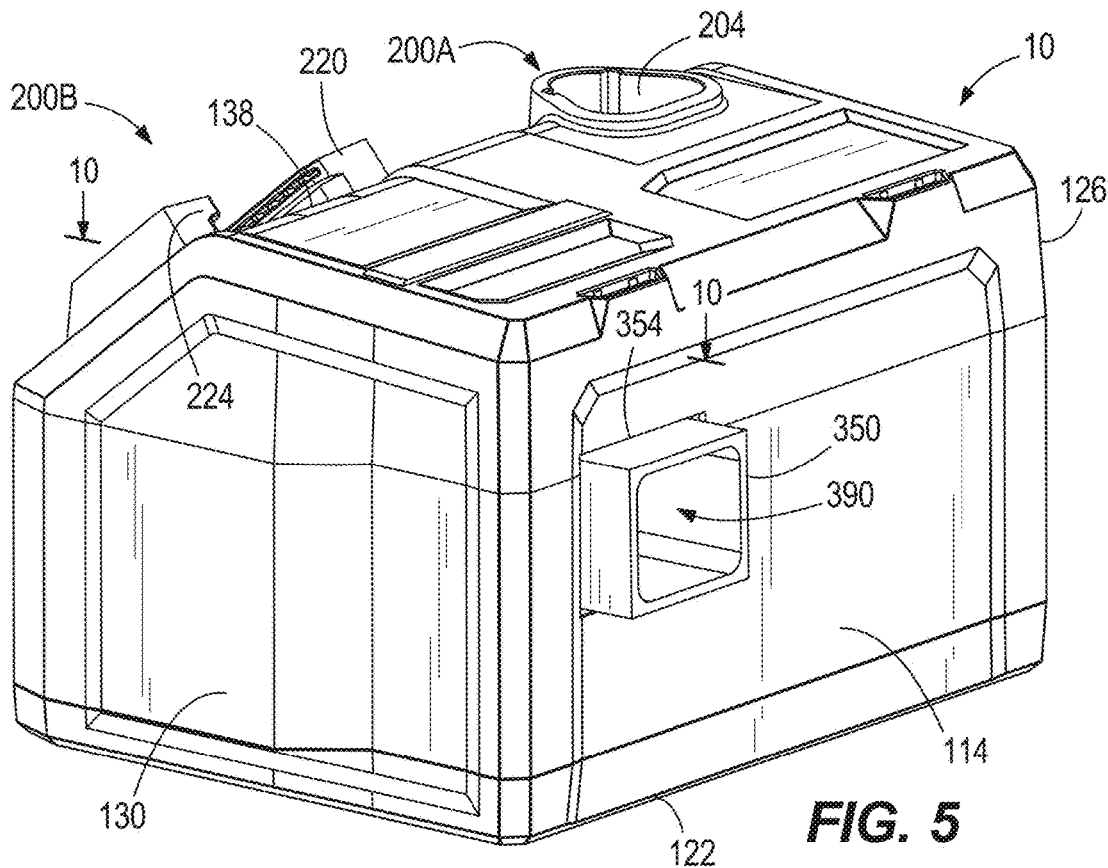
FIG. 5 is a rear perspective of the charger of FIG. 1.

The housing 100 further includes an air outlet 500 positioned below the first charging interface 200A (e.g., the recess 204). As such, the illustrated air outlet 500 is below the battery pack 14A when coupled to the charger 10. In addition, the illustrated outlet 500 includes slots 504 (e.g., longitudinal slots) defined in and extending through the inclined portion 138 and, partially, by the first portion 132. In other constructions (not shown), the slots 504 may extend in a latitudinal direction, a combination longitudinal/latitudinal direction, etc. The slots 504 are configured to facilitate air flow into the housing 100. Another air outlet 508 configured as one or more slots 512 may extend through the bottom wall 122 as well (FIG. 4). The inlets 520, 524 and the outlets 500, 508 are positioned on different locations of the housing 100.

With reference to FIGS. 7 and 8, the charger 10 may also include a heat sink 530 and a second fan 534 or blower (e.g., a DC blower) within the housing 100 to provide a heat dissipating structure. A temperature sensor (not shown) is disposed in the housing 100 and positioned near the charger electronics 154 (e.g., near the component(s) generating the most heat (e.g., the CPU, the transformer, field effect transistors (FETs), etc.)) or the heat sink 530. In the illustrated construction, the heat sink 530 is disposed in the housing 100 proximate the rear wall 114. In other constructions (not shown), the heat sink 530 may be positioned at other locations in the housing 100. The heat sink 530 is in heat transfer relationship with components of the charger electronics 154 (e.g., is mounted onto and in contact with the PCB 158). In other words, heat transfers from the heat-generating components of the charger 10 to the heat sink 530 through conduction.

In the illustrated construction, the heat sink 530 is formed of heat-conducting material, such as, for example, aluminum, and extends between opposite ends 538, 542. Furthermore, the illustrated heat sink 530 is constructed of one or more hollow tubes 546 (three are shown in FIG. 7), each having a rectangular shape and stacked above one another. The tubes 546 extend between the opposite ends 538, 542. As such, the illustrated heat sink 530 forms a tubular heat sink. The first end 542 forms an inlet of each tube 546 for air flow to enter the heat sink 530, and the second end 538 forms an outlet of each tube 546 for air flow to exit the heat sink 530. As shown in FIG. 7, the inlet of each tube 546 is angled toward the front of the housing 100. In other or additional embodiments, the heat sinks may be flat plates rather than tubular heat sinks.

The second fan 534 is positioned between the first end 542 of the heat sink 530 and the inlets 520, 524. A baffle 550 extends between the first end 542 and the fan 534 for directing air flow from the heat sink 530 to the outlets 500, 508. The second fan 534 is a multi-speed fan operable to rotate at more than one speed and directs air flow from the inlets 520, 524 through the housing 100 and to the outlets 500, 508. The speed at which the fan 534 rotates may be determined based on a temperature of one or more of the charger electronics 154, the heat sink 530, a supported battery pack 14A, 14B, etc. The temperature sensor is configured to measure the temperature and transmit a signal output to the microcontroller for determining the temperature of the charger 10. Subsequently, the microcontroller controls the speed of the second fan 354 based on the temperature (e.g., of the heat sink 530, as illustrated). In some constructions, at full speed, the second fan 354 generates an air flow of between about 13.6 $m^3$/hour and about 25.5 $m^3$/hour. Still further, in some constructions, the second fan 154 may generate an air flow of about 20.4 cubic feet per minute (CFM) and up to about 35 $m^3$/hour or less.

As shown in FIG. 7, the charger 10 defines a second flow path or passage Y through the housing 100 that is separate from the first airflow X, X'. In the illustrated construction, second air flow flows along the flow path Y from the inlets 520, 524, over the charger electronics 154 (e.g., the PCB 158) to the inlet of the heat sink 530, and through the heat sink 530 to the outlets 500, 508. The second fan 354 directs the second air flow along the flow path Y. Furthermore, the second fan 354 directs the second air flow Y into the inlet and outlet 542, 538 of each tube 546. The second air flow Y operates to dissipate heat generated by the charger electronics 154 from the housing 100. In other constructions (not shown), the second fan 354 may be operated in reverse such that the second flow path Y through the housing 100 is reversed.

In operation, one or both of the battery packs 14A, 14B are coupled to the respective charger interface 200A, 200B (e.g., the supporting sections 64A, 64B) for charging. The first set of terminals 212 electrically connect with the battery pack terminals of the first battery 14A, and/or the second set of terminals 260 electrically connect with the battery terminals of the second battery 14B. The charger 10 supplies charging current to the first and/or second battery 14A, 14B.

FIGS. 19-31 illustrate a charging system according to another construction including a battery charger 600 operable to charge a battery pack 614. The battery pack of FIGS. 19-29 is similar to the battery pack of FIGS. 14A-15. Therefore, the battery pack 614 will not be described in detail and like reference numerals plus "600" will refer to like structure in the description below.

Figure 19:
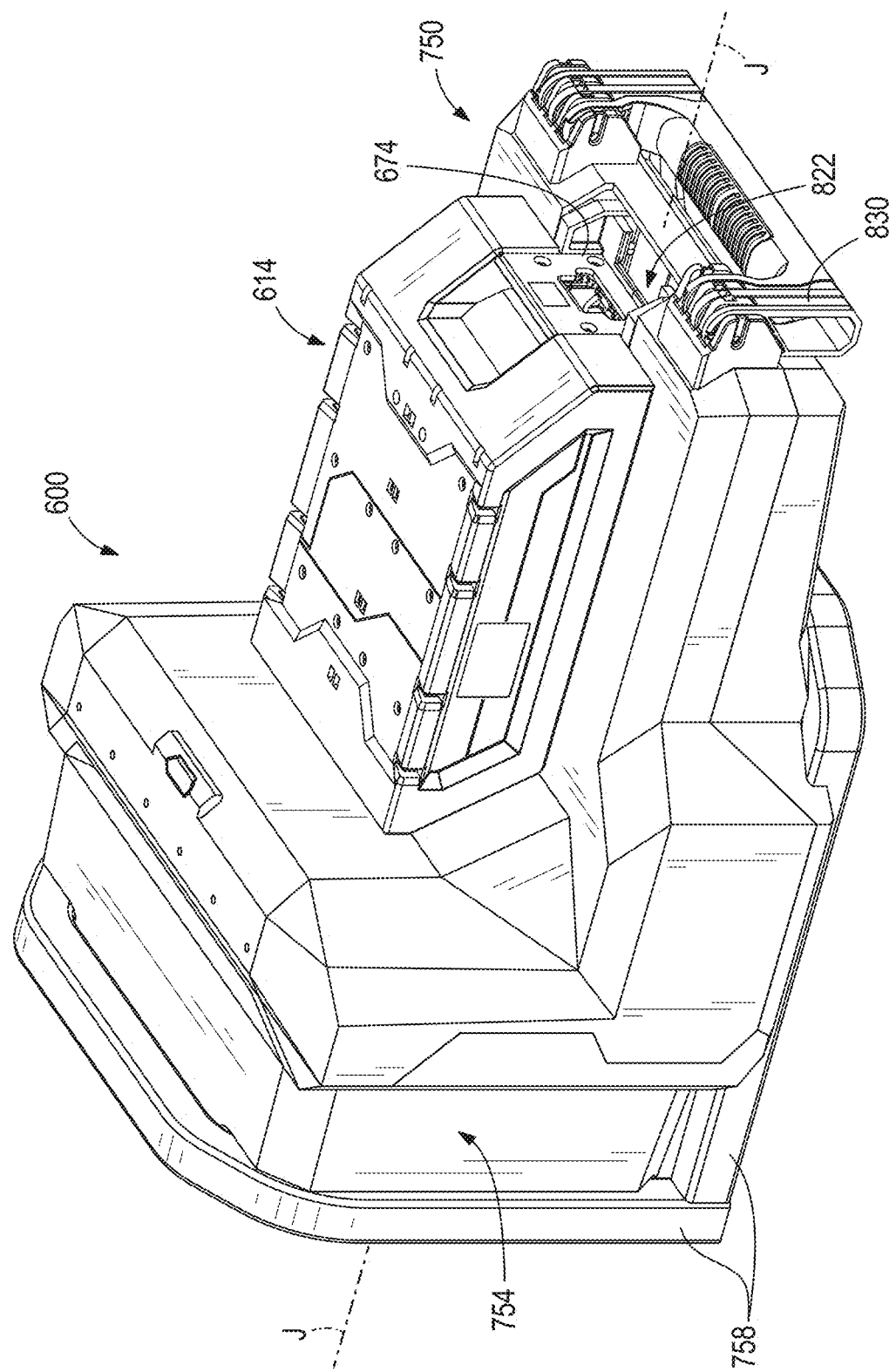
FIG. 19 is a perspective view of a battery charger according to another construction coupled to a complementary battery pack.

With respect to FIG. 19, the battery charger 600 includes a housing 750, 754 having a longitudinal axis J and a frame member 758 coupled to the housing. The housing 750, 754 includes a battery pack receiving portion 750 and a charger electronics portion 754 that is coupled to the battery pack receiving portion 750. In some constructions, the battery pack receiving potion 750 may be sealed with respect to the charger electronics portions 754.

Figure 21:
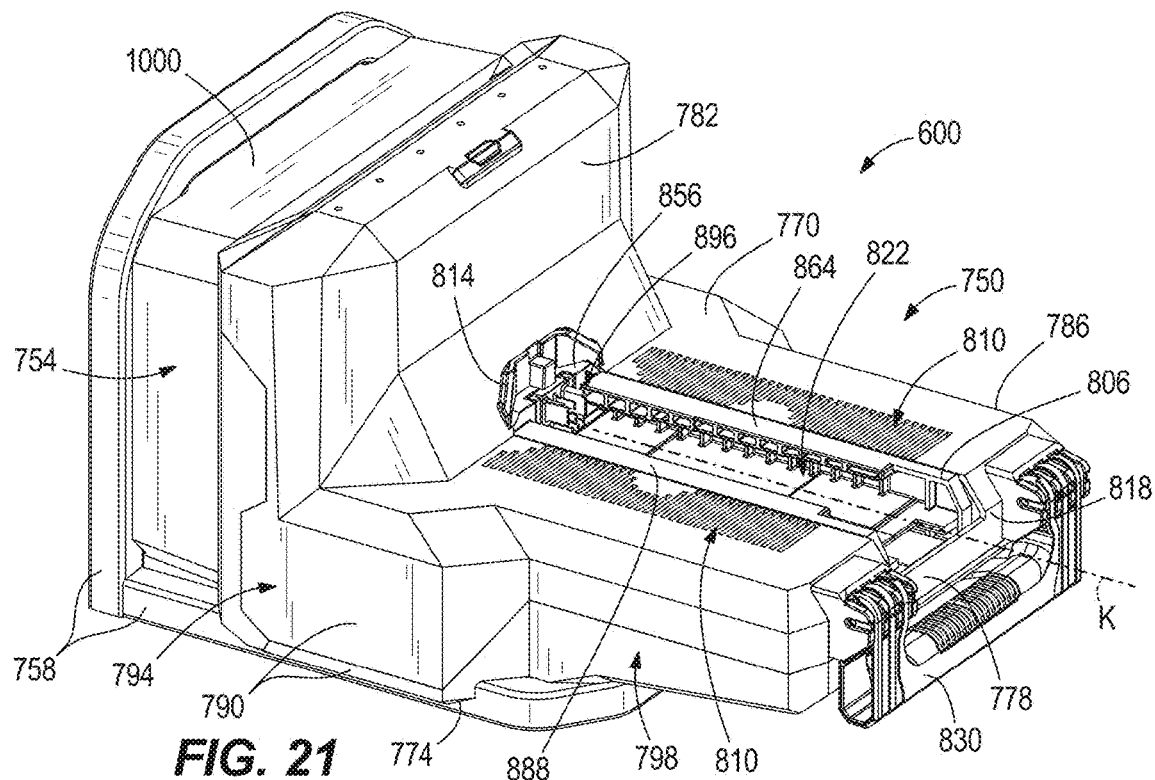
FIG. 21 is a perspective view of the battery charger of FIG. 19.

As shown in FIG. 21, the battery pack receiving portion 750 includes a first wall 770, a second wall 774, a third wall 778, a fourth wall 782, a fifth wall 786, and a sixth wall 790. In the illustrated construction the first wall 770 is the top wall and the second wall 774 is the bottom wall and therefore the first wall 770 and the second wall 774 are spaced apart from one another. Specifically, the first wall 770 and the second wall 774 are positioned opposite one another. The third wall 778 is the front wall and the fourth wall 782 is the rear wall and therefore the third and fourth walls 778, 782 are spaced apart from one another. Specifically, the third wall 778 and the fourth wall 782 are positioned opposite one another. The fifth and sixth walls 786, 790 couple the first wall 770, the second wall 774, third wall 778 and fourth wall 782. In the illustrated embodiment and as shown in FIG. 21, the battery pack receiving portion 750 is defined by a first portion 794 and a second portion 798. The first portion 794 includes the first wall 770 and the fourth wall 782, while the second portion 798 includes the second wall 774. The first portion 794 and the second portion 798 together define the third wall 778, the fifth wall 786, and the second wall 774. The first and second portions 794, 798, and therefore the walls 770, 774, 778, 782, 786, 790, are molded from a plastic material.

The first wall 770 includes an elongate opening 806 and a plurality of vent holes 810 extending therethrough. The elongate opening 806 has a closed end 814 adjacent the fourth wall 782 and an open end 818 adjacent the third wall 778. A charger interface 822 is positioned in the elongate opening 806, at least partially supported by the first wall 770, and configured to receive the battery pack interface 654. A first set of the plurality of vent holes 810 are positioned on one side of the elongate opening 806 and a second set of the plurality of vent holes 810 are positioned on an opposite side of the elongate opening 806. The second wall 774 includes a plurality of vent holes 826 (FIGS. 22 and 23) extending therethrough. A handle 830 extends from and is movable (e.g., pivotable) relative to the third wall 778.

Figure 20:
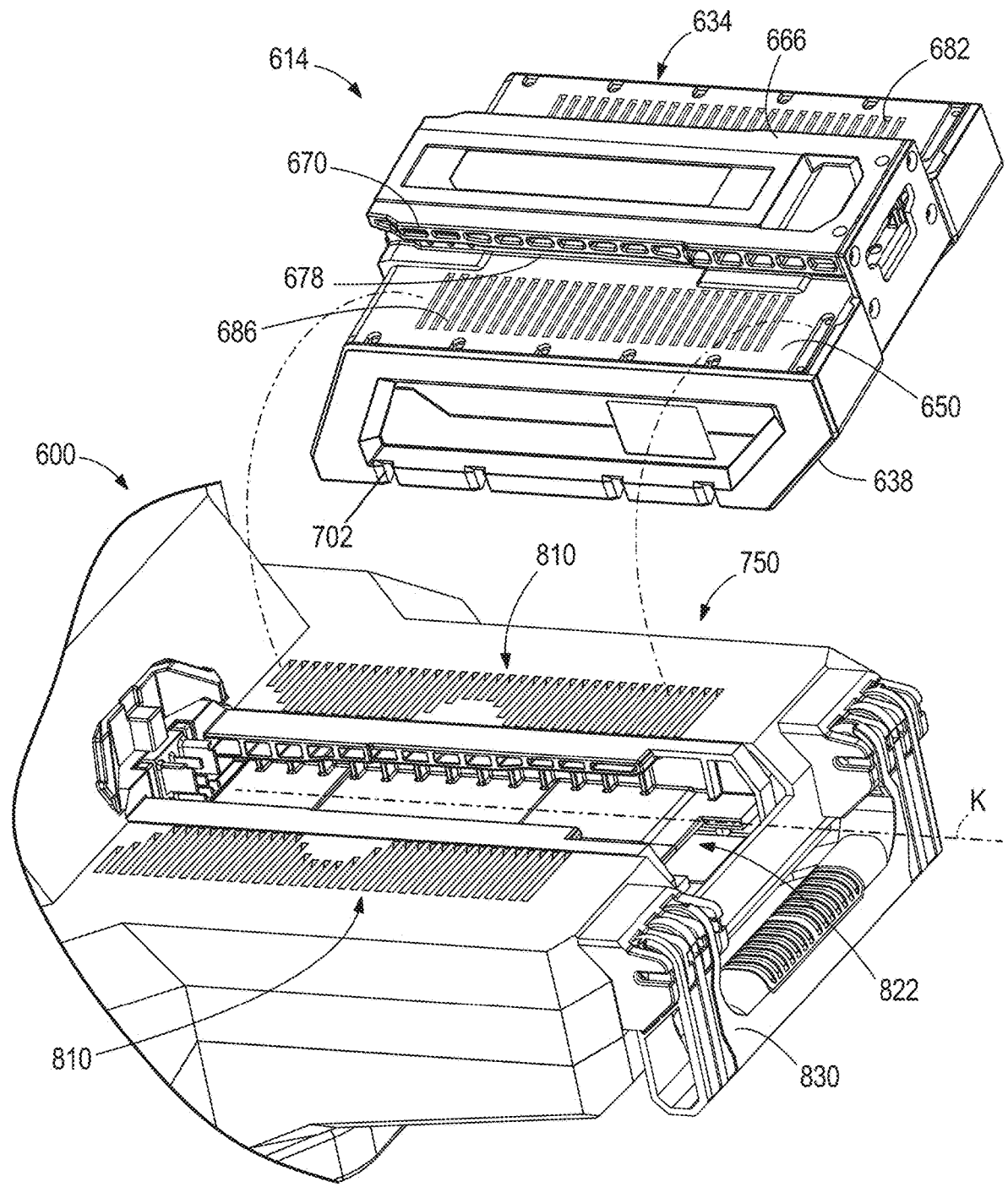
FIG. 20 is an exploded view of the battery charger and the battery pack of FIG. 19.

The charger interface 822 of FIGS. 19-21 has an insertion axis K (FIG. 21) that is parallel to the longitudinal axis J and is at least partially defined by a first supporting member 840 and a second supporting member 844. With respect to FIG. 22, the first supporting member 840 includes a first side wall 848 positioned adjacent one side of the elongate opening 806, a first recessed wall 852 extending from the first side wall 848, and a first portion 856 of a terminal block 860 positioned within the battery pack receiving portion 750 adjacent the closed end 814. The first side wall 848 includes a first rail member 864 extending therefrom and a first groove 868 is positioned between the first rail member 864 and the first recessed wall 852. The second supporting member 844 includes a second side wall 876 positioned adjacent an opposite side of the elongate opening 806, a second recessed wall 880 extending from the second side wall 876, and a second portion 884 of the terminal block 860 positioned within the battery pack receiving portion 750 adjacent the closed end 814 and the first portion 856 of the terminal block 860. The second side wall 876 includes a second rail member 888 extending therefrom and a second groove 892 is positioned between the second rail member 888 and the second recessed wall 880. A surface of each of the rail members 864, 888 is coextensive with an adjacent surface of the first wall 770 and the surfaces of the recessed walls 852, 880 are recessed relative to the surface of the first wall 770. The rail members 864, 888 are spaced apart and substantially parallel to one another. The insertion axis K is parallel to the rail members 864, 888. Charging terminals 896 extend from each portion 856, 884 of the terminal block 860.

Figure 22:
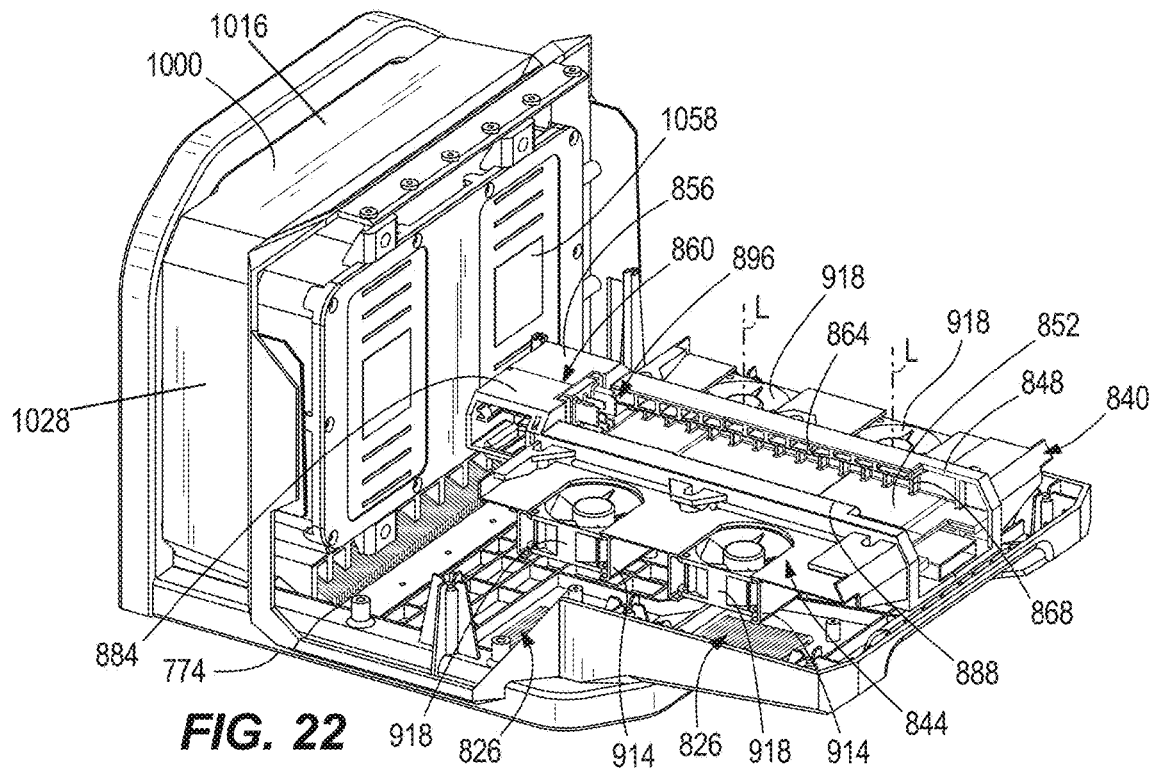
FIG. 22 is a perspective view of the battery charger of FIG. 19 with a portion of the housing removed and showing a fan orientation.

As shown in FIGS. 21-22, the first supporting member 840 further includes one or more (in the illustrated embodiment two) fan or blower support members 910 extending from the first side wall 848 opposite the first recess wall 852. The fan supporting members 910 of the first supporting member 840 are positioned within the battery pack receiving portion 750 adjacent the first set of vent holes 810. Similarly, the second supporting member 844 further includes one or more (in the illustrated embodiment two) fan or blower support members 914 extending from the second side wall 876 opposite the second recess wall 880. The fan supporting members 914 of the second supporting member 840 are positioned within the battery pack receiving portion 750 adjacent the second set of vent holes 810.

Figure 23:
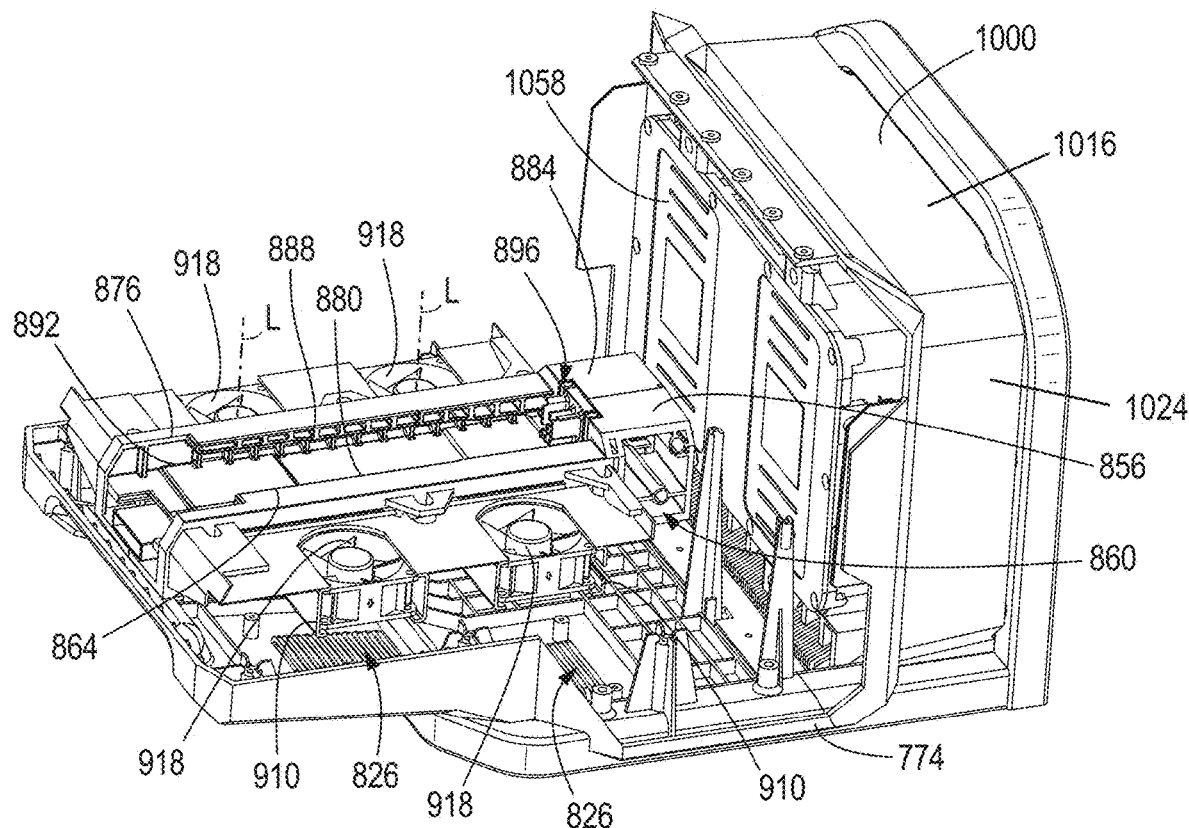
FIG. 23 is another perspective view of the battery charger of FIG. 19 with a portion of the housing removed and showing a fan orientation.

As shown in FIGS. 22-23, each of the fan supporting members 910, 914 receives and supports a fan 918 or blower (e.g., a DC blower) such that a plurality of fans 918 or blowers is positioned within the battery pack receiving portion 750 between the first wall 770 and the second wall 774. Each of the fans 918 is therefore positioned at or adjacent to one or more of the vent holes 810 in the first wall 770. The fans 918 by the fan supporting members 910 are supported such that they are spaced apart from (e.g., positioned above) the second wall 774 and one or more vent holes 826 in the second wall 774. In other constructions, there may additionally or alternatively be one or more vent holes in one or both of the fifth and sixth side walls 786, 790 (FIG. 24b). In the illustrated construction, each of the fans 918 has an axis of rotation L that is positioned at a non-parallel angle relative to the insertion axis K. In the illustrated construction, each of the fans 918 has an axis of rotation L that is perpendicular to the insertion axis K. In the illustrated construction the axes of rotation L of the fans 918 are oriented in parallel to one another, but in other or additional constructions, the axes of rotation K may be oriented in parallel or at a non-parallel angles relative to one another.

Figure 24A:
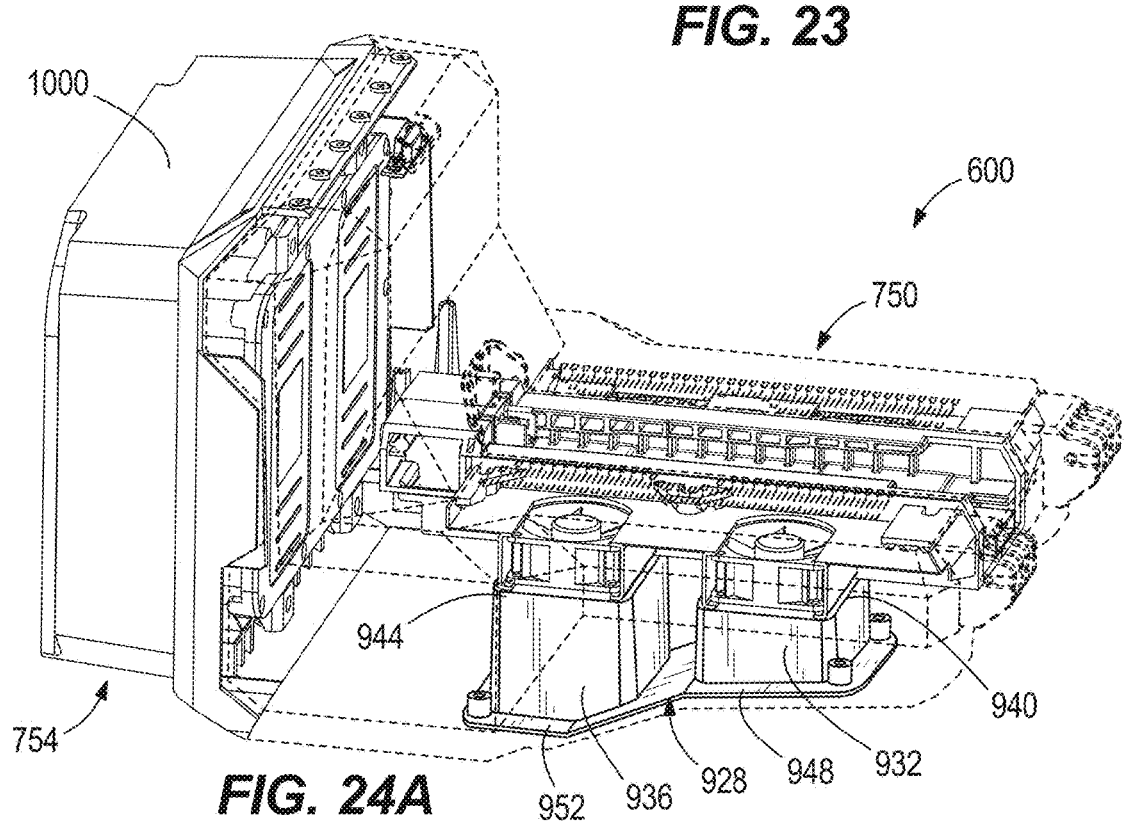
FIG. 24A is a perspective view of the battery charger with a portion of the housing removed and showing another fan orientation.
Figure 24B:
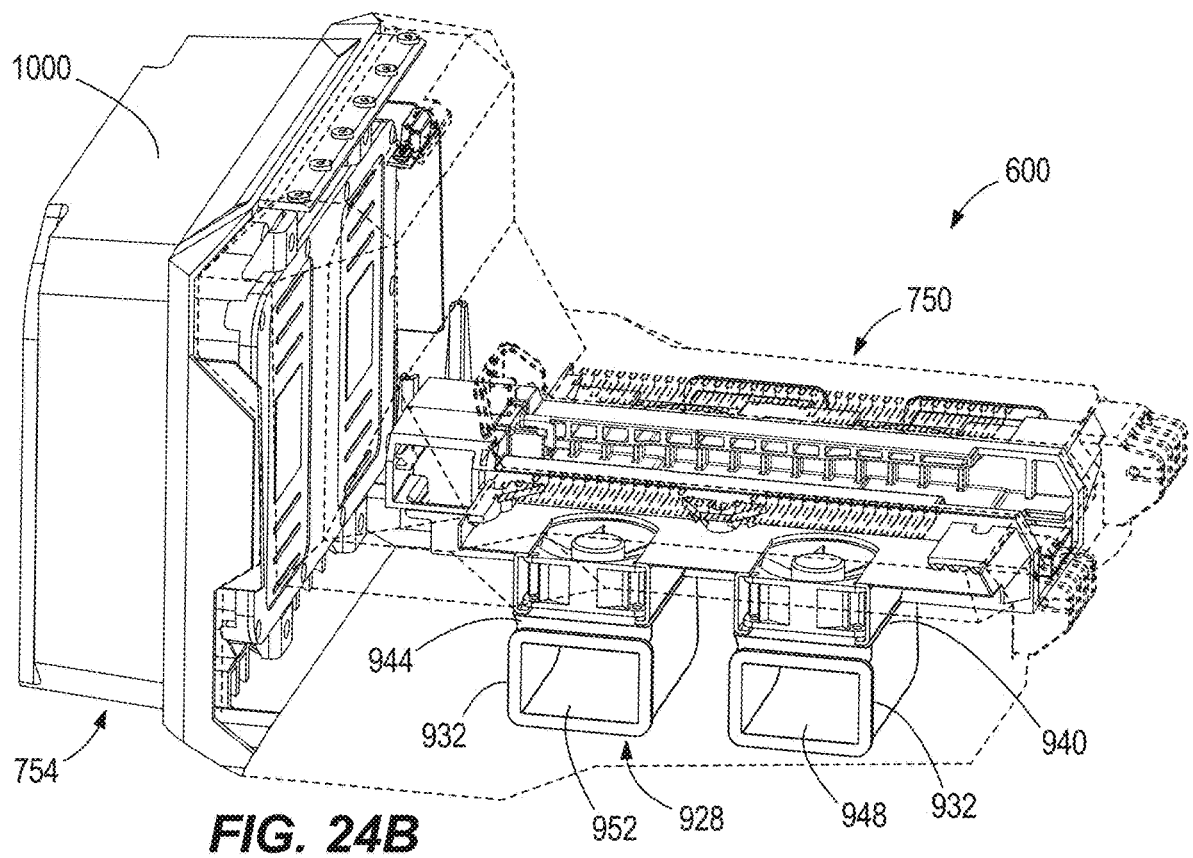
FIG. 24B is a perspective view of the battery charger with a portion of the housing removed and showing another fan orientation.
Figure 24C:
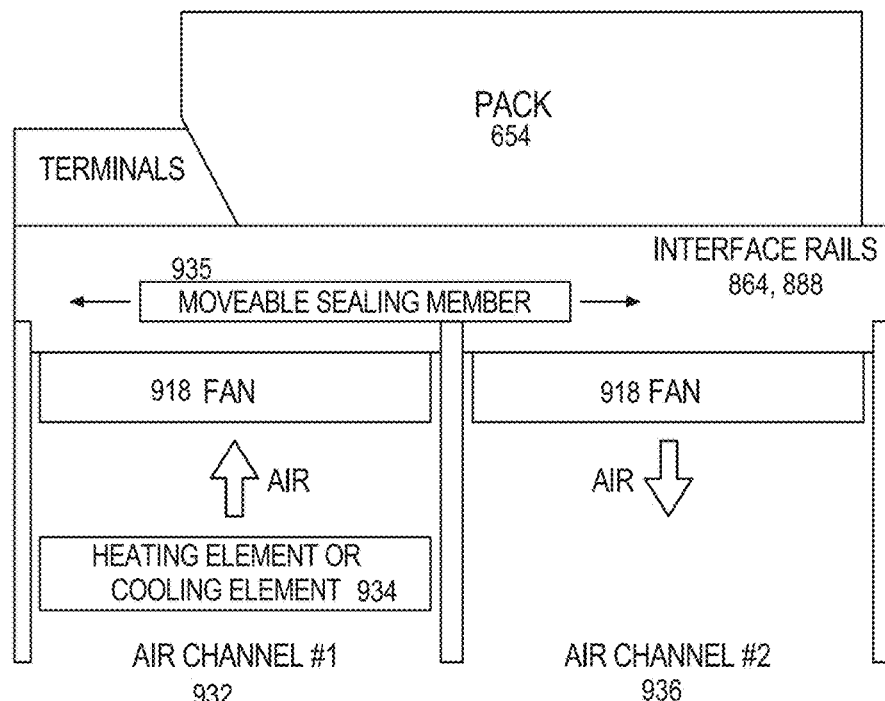
FIG. 24C is a schematic view of a battery charger having an air passage member with dual air passages.
Figure 25:
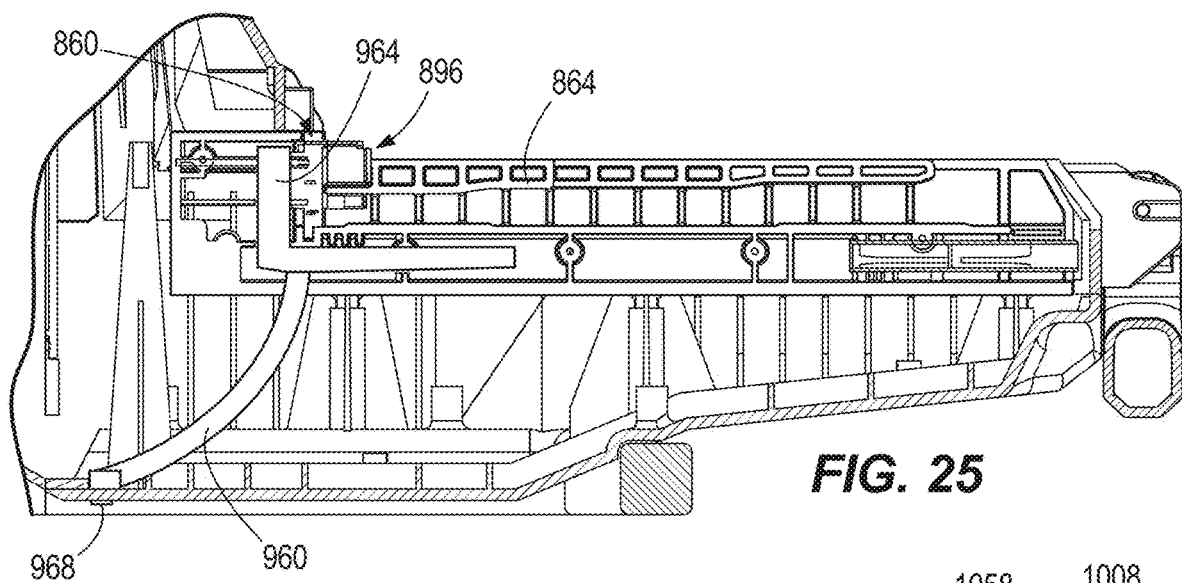
FIG. 25 is a cross-sectional view of the battery charger of FIG. 19 along an insertion axis K, shown in FIG. 21.
Figure 26:
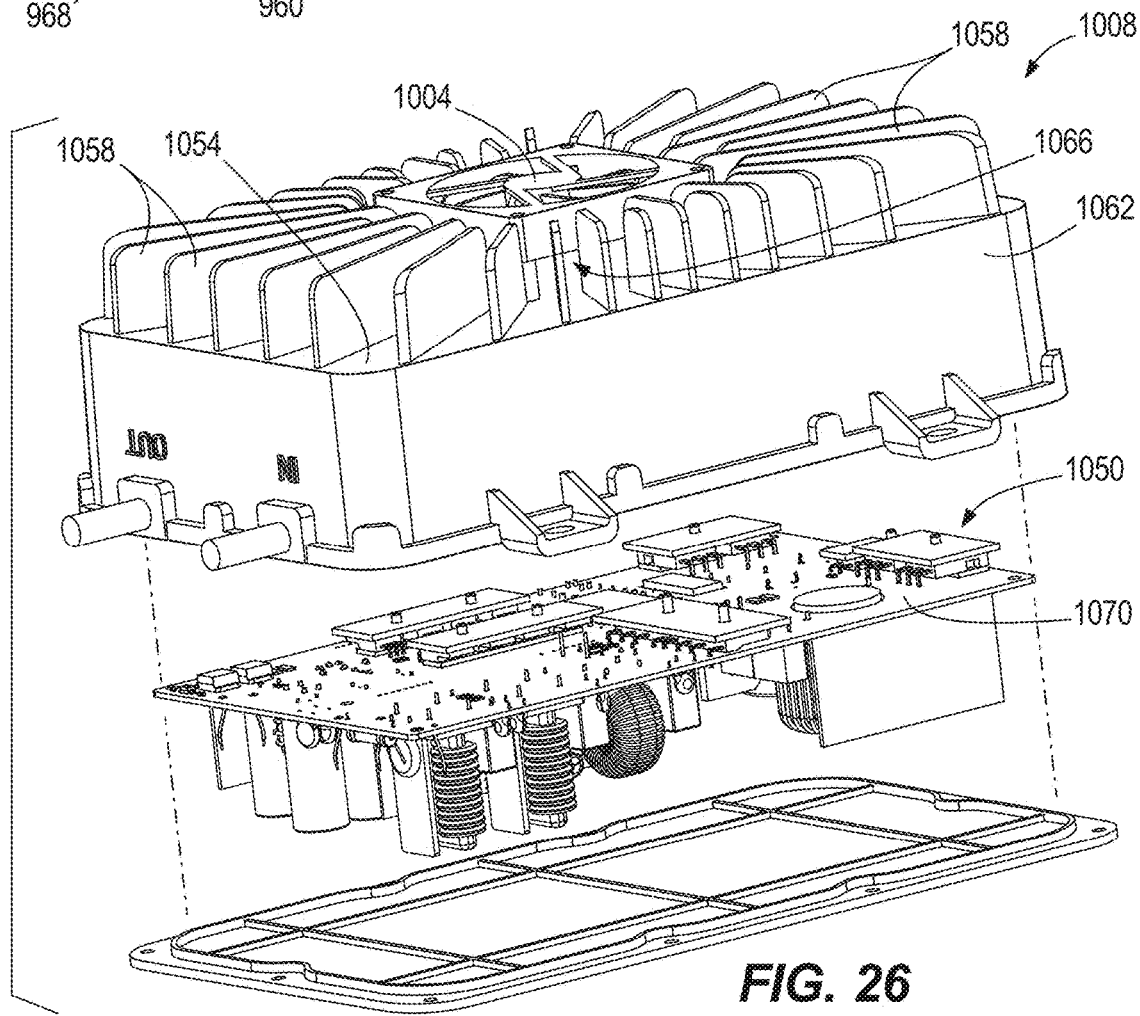
FIG. 26 is an exploded view of a charger electronics portion of the housing of the battery charger of FIG. 19.
Figure 27:
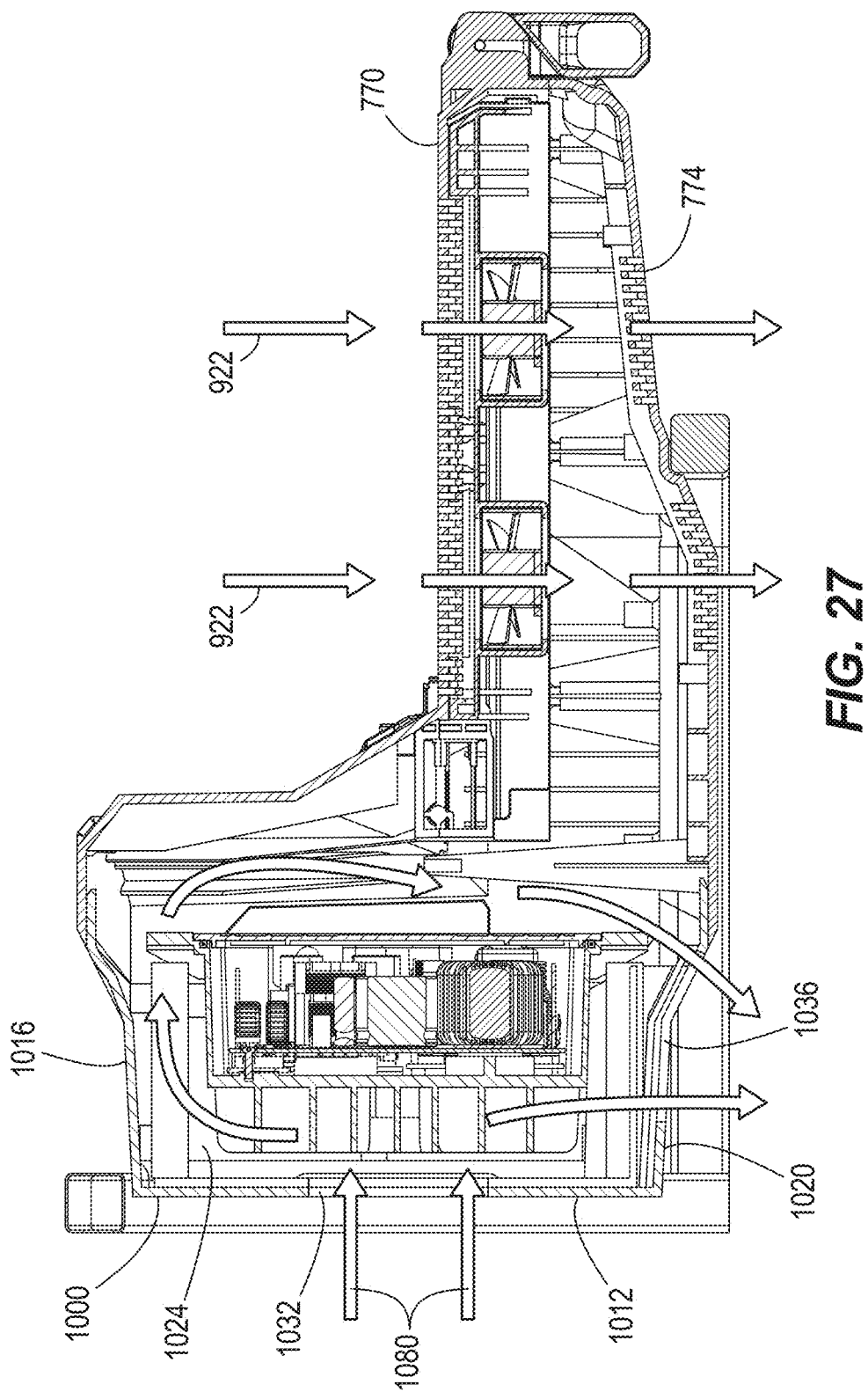
FIG. 27 is a side view of the battery charger of FIG. 19 illustrating cooling air passages.

In the constructions of FIGS. 19-27, a cooling air path or passage 922 extends from one or more of the plurality of vent holes 810 in the first wall 770 to one or more of the plurality of vent holes 826 in the second wall 774 through each of the fans 918. Accordingly, each of the fans 918 is operable to move cooling air between one or more of the vent holes 810 in the first wall 770 and one or more vent holes 826 in the second wall 774. In the illustrated embodiment, there are four fans 918, two on each side of the charger interface 822. Accordingly, there are four cooling air passages 922 defined within and extending through the battery pack receiving portion 750 of the charger housing. In other or additional constructions, there may be other or additional fans 918 and cooling air passages 922 defined within and extending through the battery pack receiving portion 750. Additionally, as shown in FIG. 26, the cooling air passages 922 guide airflow in a direction parallel to the axis of rotation L of the respective fan 918. Therefore, in the illustrated construction, the cooling air of the cooling air passages 922 moves perpendicular to the axis of the insertion K. Also, as shown in FIG. 27, air moves vertically. In other or additional constructions, there may be vent holes elsewhere in the battery pack receiving portion such that the cooling air passages may move air in a direction perpendicular and vertically relative to the insertion axis K but also in a non-perpendicular direction and horizontally relative to the insertion axis K.

In other or additional constructions, an air passage member, similar to that described above with respect to FIGS. 1-18, may define each of the cooling air passage 922. That is, in other or additional constructions, the cooling air passage 922 may be at least partially defined by an air passage member having a hollow body having a first end positioned at or adjacent the fan support member and the second end positioned at or adjacent to the one or more vent holes in the second wall 774. In these constructions, each fan 918 would be supported at or adjacent the first end of the air passage member.

Moreover, as shown in FIGS. 24A, 24B, although only one is shown, a duct member 928 may be positioned on each side of the charger interface 822. The duct members 928 may each define one or more of air passage members 932, 936 through which a respective cooling air passage 922 flows. In other words, the duct member 928 may define a first air passage member 932 and a second air passage member 936. The respective first air passage member 932 includes an inlet 940 that is configured to be positioned at or adjacent to and in communication with the respective one of the fans 918 and the air passage member 936 includes an inlet 944 that is configured to be positioned at or adjacent to and in communication with an adjacent fan 918. Each of the respective first and second air passage members 932, 936 includes an outlet 948, 952 that is at or adjacent to and in communication with one or more of the second plurality of vent holes 826.

As shown in FIG. 24C, air may be guided in a first direction (e.g., to the battery pack 654) through one of the air passages 932 and may be guided in a second direction (e.g., away from the battery pack 654) through the other of the air passages 936. Moreover, one of the air passages 932, 936 may include a heating element or a cooling member 934 that is in electrical communication with the charger electronics. A movable valve or seal 935 selectively opens and closes the air passage 932a, 932b. In the illustrated construction, the seal 935 is positioned between the fan 918 and the vent holes 810, but in other constructions, the seal 935 may be positioned elsewhere (e.g., within the air passage 932, 936). The heating element or cooling member 934 may be actuated to blow air that is higher (e.g., via the heating element) or lower (e.g., via the cooling element) than ambient air temperature into the battery pack 654 to respectively heat up the cells or cool the cells of the battery pack 654. The seal 935 is movable between a first, closed position when the heating element or cooling element 934 is not being used and a second, open position when the heating element or cooling element 934 is being used. The heating element or cooling element 934 and the seal 935 may be manually actuatable by a user or automatically actuatable via the charger electronics (e.g., a controller and a temperature sensor). The other of the air passages 932, 936 may always open to suck or blow ambient air into battery pack 654 via charger 600, as discussed herein. In other constructions, the seal 935 may alternatively open and close the air passages 932, 936, depending on which is being used.

In other constructions, one or both of the air passage members 932, 936 may be divided into separate air passages thereby creating a dual-air passage member. In these constructions, air may be guided in a first direction (e.g., to the battery pack 654) through one of the dual-air passages and may be guided in a second direction (e.g., away from the battery pack 654) through the other of the due-air passages 936. Similarly, one of the dual-air passages may include the heating element or the cooling member 934 that is in electrical communication with the charger electronics, such that air is guided through the dual-air passages as discussed above with respect to FIG. 24C.

As shown in FIG. 25, the charger 600 includes a drain member 960 configured to drain fluid from the charger interface 822 to an area outside of the charger 600. In the illustrated construction, the drain member 960 includes a first end 964 positioned adjacent to and in communication with an area adjacent the terminal block 860 and second end 968 positioned at or adjacent to and in communication with an aperture (not shown) that extends through one of the other walls of the battery pack receiving portion 750. In the illustrated construction, the second end 968 is positioned at or adjacent to and in communication with an aperture that extends through the second wall 774. In other constructions, the second end 968 is positioned at or adjacent to and in communication with an aperture that extends through the another of the walls that is spaced apart from the first wall 770.

With respect to FIGS. 22, 23, 26 and 27, the charger electronics portion 754 includes a cover 1000, a fan 1004 or blower (e.g., a DC blower), and a charger electronics housing 1008. In the construction of FIG. 24, the cover 1000 is formed from a plastic material and includes a rear wall 1012 (FIG. 27), a top wall 1016 (FIGS. 22, 23, 27), a bottom wall 1020 (FIG. 27), a first side wall 1024 (FIG. 23), and a second side wall 1028 (FIG. 22). Each of the walls 1016, 1020, 1024, 1028 is coupled to and extends from the rear wall 1012. With respect to FIG. 27, the rear wall 1012 includes a first plurality of vent holes 1032 and one or more of the walls 1016, 1020, 1024, 1028 includes a second plurality of vent holes 1036. In the illustrated construction, the second plurality of vent holes 1036 is in the bottom wall 1020, but in other constructions the second plurality of vent holes 1036 could be in the other walls, as well or alternatively.

With respect to FIG. 26, the charger electronics housing 1008 is constructed of metal and has a plurality of walls that define a sealed (e.g., fluid and debris) box-like structure that encloses the charger electronics 1050. In the illustrated construction, the metal is aluminum, but other suitable metals may be used instead or in addition to aluminum. A first wall 1054 of the charger electronics housing 1008 includes a plurality of fins 1058 (or other heat dissipating members) extending therefrom and a second, opposite wall 1062 supports the charger electronics 1050. A plurality side walls 1062 extend from the first wall 1054 toward the second wall 1058. The plurality of side walls 1062 is coupled to the second wall to sealably (e.g., to enclose the charger electronics therein. The plurality of fins 1058 forms a recess 1066 that is sized and shaped to receive the fan 1004. The charger electronics 1050 include, among other things, a printed circuit board (PCB) 1070 and a charger microcontroller. The charger electronics may include any suitable configuration. In the embodiment of FIG. 26, the PCB 170 is positioned adjacent the first wall 1054.

The cover 1000 is coupled to (e.g., by fasteners or the like, not shown) to the battery pack receiving portion 750. Specifically, the walls of the cover 1000 are coupled to the second, fourth, fifth, and sixth walls 774, 782, 786, 790 of the battery pack receiving portion 750. The fan 1004 and the charger electronics housing 1008 are positioned between and enclosed by the cover 1000 and the battery pack receiving portion 750. As shown the first wall 1054 having the fins 1054 is positioned adjacent the rear wall 1012 such that the fan 1004, which is received in and movable (e.g., rotatable) relative to the recess 1066, is positioned adjacent the first plurality of vent holes 1032. A cooling air passage 1080 is defined between the first plurality of vent holes 1032 and the second plurality of vent holes 1036 and the fan 1004 is positioned between the first plurality of vent holes 1032 and the second plurality of vent holes 1036.

In use and as shown in FIGS. 19 and 26, the rail members 864, 888, and grooves 868, 892 are engageable with respective grooves 674, 678 and rails 666, 670 on the battery pack 614 to bring the charging terminals 896 into electrical and physical engagement with the battery terminals such that the charger 600 is able to charge the batteries of the battery pack 614. When the battery pack 614 is coupled to the charger interface 822, the vent holes 810 in the first wall 770 are configured to align and communicate with the respective first plurality of vent holes 682 and second plurality of vent holes 686 in the wall 650 of the first portion 634 of the battery pack 614. When the battery pack 614 is coupled to the battery charger 600, each of the fans 918 of the battery pack receiving portion 750 are operable to move cooling air between an interior of the battery pack 614 and an area outside of the charger 600 via the respective cooling air passage 922. In the illustrated construction, the fans 918 are operable to suck ambient air through holes 702 in the battery pack 614, through the interior of the battery pack 614, and into the charger 600 (e.g., the battery pack receiving portion 750) via the respective plurality of vent holes 810 in the first wall 770 and expel the air through the respective plurality of vent holes 826 in the second wall 774 such that air can move through the battery pack 614 and be removed therefrom by flowing through the charger 600. In other constructions, the fans 918 suck hot air from within the interior of the battery pack 614 into the charger 600 (e.g., the battery pack receiving portion 750) via the respective plurality of vent holes 810 in the first wall 770 and expel the air through the respective plurality of vent holes 826 in the second wall 774 such that hot air from within the battery pack 614 is removed therefrom by flowing through the charger 600. In still other constructions, the fans 918 suck air from an area outside of the charger 600 into the charger 600 (e.g., the battery pack receiving portion 750) via the respective plurality of vent holes 826 in the second wall 774 and expel the air through the respective plurality of vent holes 810 in the first wall 770 into the vent holes 682, 686 of the battery pack 614 such that ambient air from the area outside the charger 600 is blown into the battery pack 614 to cool the cells of the battery pack 614. In other constructions, air having a temperature that is less than or greater than an ambient air temperature may be sucked or blown into the charger 600 and/or battery pack 654, as discussed above with respect to FIG. 24C. In some constructions, the battery pack 654 completely covers or extends beyond the first wall 770 such that air is forced through the battery pack 654 and not around the battery pack 654. The terminal block 860 is not sealed relative to battery pack receiving portion 750 so water or other fluids may drain from the interior of the battery pack 654 and the charger interface 822 to the area outside of the charger 600 via the drain member 960.

Additionally, the fan 1004 and cooling air passage 1080 of the charger electronics portion 754 are operable to cool the charger electronics housing 1008. In the illustrated construction, the fan 1004 sucks ambient air from an area adjacent the first plurality of vent holes 1032 into the charger electronics portion 754 via the respective first plurality of vent holes 1032 in the rear wall 1012 and expel the air through the respective second plurality of vent holes 1036 in the second wall 1020 such that cooling air moves by convection around (and therefore in any direction within) the charger electronics portion 754 to the second plurality of vent holes 1036, where the air exits the charger electronics portion 754. The cooling air passages 922 of the battery pack receiving portion 750 and the cooling air passage 1080 of the charger electronics portion 754 are substantially separate from one another and therefore the air does not mix.

Figure 28:
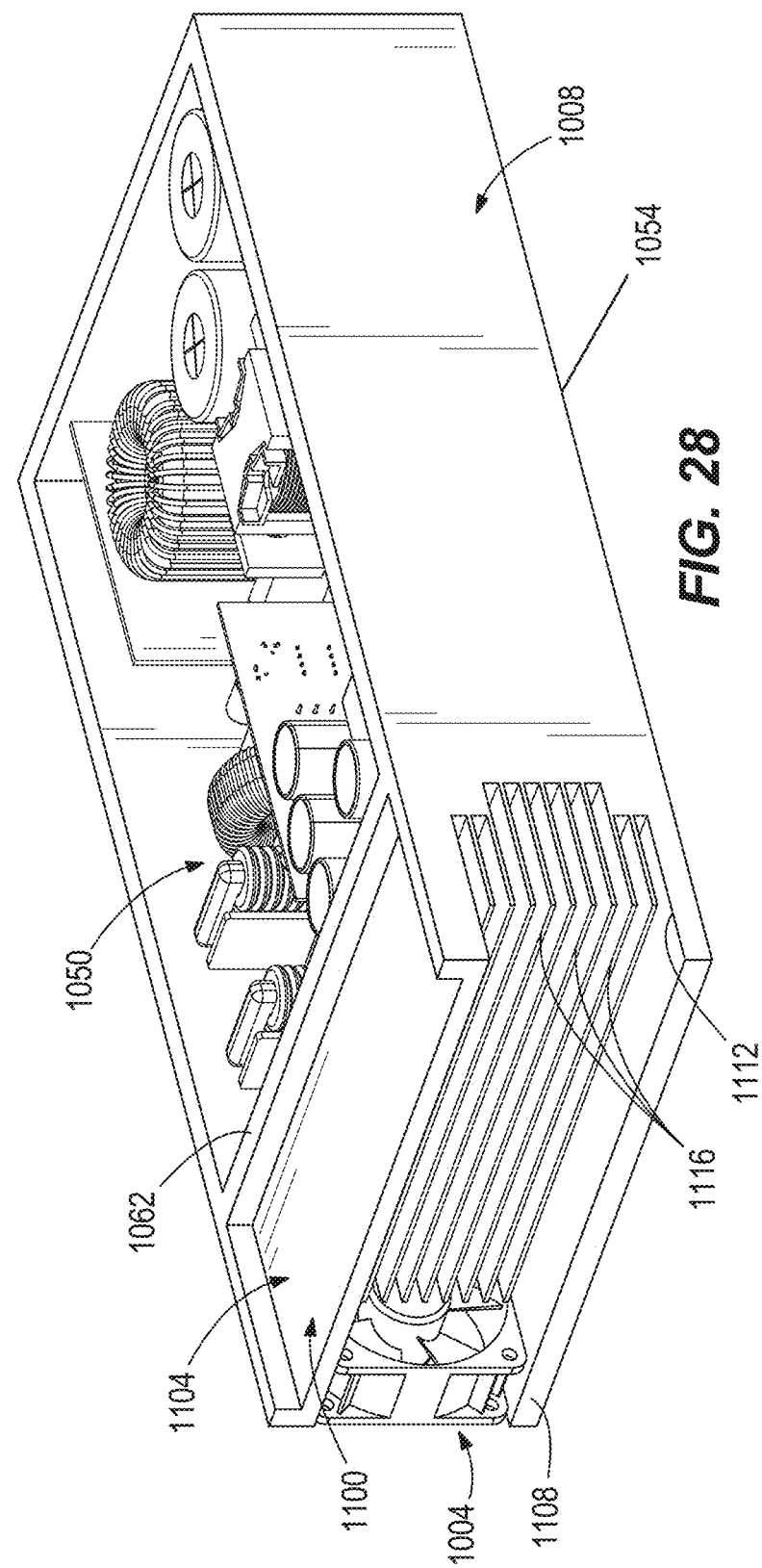
FIG. 28 is a perspective view of a charger electronics portion of the housing of the battery charger of FIG. 19 according to another construction.

In another construction, illustrated in FIGS. 28 and 30-31, the charger electronics portion 754 has alternative configuration. The charger electronics portion 754 of FIG. 28 is similar to the charger electronics portion 754 of FIG. 26, and therefore only the differences between the charger electronics portions 754 of FIG. 26 and FIG. 28 will be discussed.

As shown in FIG. 31, the first side wall 1024 of the cover 1000 includes the first plurality of vent holes 1032 and the second side wall 1028 of the cover 1000 includes a second plurality of vent holes 1036. In the construction of FIG. 28, an air passage member 1100 is integrally formed with or otherwise coupled to one of the plurality of side walls 1062 of the charger electronics housing 1008 and has an air channel 1104 extending therethrough. Accordingly, the side wall 1062 to which the air passage member 1100 is coupled defines a partitioning wall 1062 that separates the interior of the charger electronics housing 1008 (which houses the charger electronics 1050 and is filled with a potting compound) from the air channel 1104 of the air passage member 1100. The air passage member 1100 has a first open end 1108 and a second open end 1112. The fan 1004 may be supported at either the first or second open ends 1108, 1112 of the air passage member 1100. In the illustrated embodiment, the fan is supported at the first open end 1108. The air passage member of FIG. 27 has a plurality of fins 1116 (or other heat dissipating members) that extend from one side across at least a portion of the air channel 1104. In the illustrated construction of FIG. 28, the air passage member 1100 is not completely enclosed as a side opposite the side wall defines an elongated opening. In other constructions, the side opposite the side wall may be defined a wall that may or may not have openings extending therethrough.

The charger electronics housing of FIG. 28 is positioned within the cover 1000 and between the cover 10000 and battery pack receiving portion 750 such that the first end 1108 of the air passage member 1100, and therefore, the fan 1004 is positioned adjacent the first or second plurality of vent holes 1032, 1036 and the second end 1112 of the air passage member 110 is positioned adjacent the other of the first and second plurality of vent holes 1032, 1036. A cooling air passage 1140 is defined between the first or second plurality of vent holes 1036, 1036 in the cover 1000, the fan 1004, the second end of the air passage member 1112, and the other of the first or second plurality of vent holes 1032, 1036.

Figure 29:
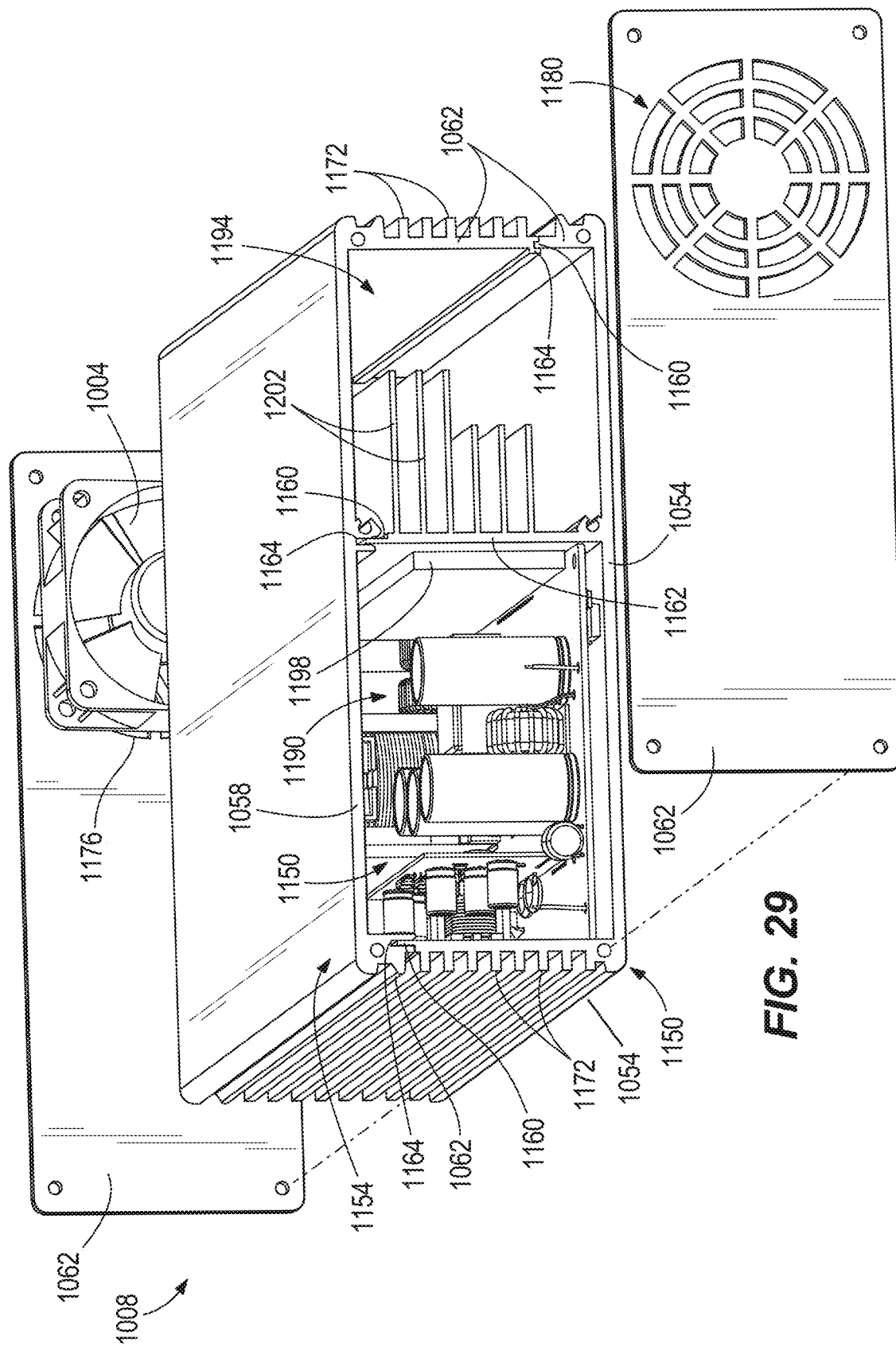
FIG. 29 is an exploded view of a charger electronics portion of the housing of the battery charger of FIG. 19 according to another construction.

In another construction, illustrated in FIG. 29-31, the charger electronics portion 754 has an alternative configuration. The charger electronics portion 754 of FIG. 29 is similar to the charger electronics portion 754 of FIGS. 26 and 28, and therefore only the differences between the charger electronics portions of FIGS. 26, 28 and FIG. 29 will be discussed.

As shown in FIG. 31 and like the cover of FIG. 28, the first side wall 1024 of the cover 1000 includes the first plurality of vent holes 1032 and the second side wall 1028 of the cover 1000 includes a second plurality of vent holes 1036. In the construction of FIG. 29, the charger electronics housing defines a first housing portion 1150 and a second housing portion 1154. The first housing portion 1150 includes the first wall 1054 and a portion of first and second side walls 1062 extending therefrom. The first and second side walls 1062 are on opposite sides of the housing 1008 from one another. Each of the first and second side walls 1062 defines a flange 1160 extending along the length of the respective wall 1062. Additionally, a partition wall 1162 extends from the first wall 1054 between the first and second side walls 1062 and extends the length of the first and second side walls 1062. The partition wall 1162 of the first housing portion 1150 has a flange 1160 projecting therefrom and extending along the length of the wall 1162. The second housing portion 1154 includes the second wall 1058 and a portion of the first and second side walls 1062 extending therefrom. Each of the first and second side walls 1062 of the second housing portion 1154 have a coupling groove 1164 projecting therefrom and extending along the length of the respective wall 1062. Additionally, a coupling groove 1164 extends form the second wall 1058 between the first and second side walls 1062 and extends the length of the first and second side walls 1062. The coupling groove 1164 on each of the first and second side walls 1062 of the second housing portion 1154 is configured to receive the flange 1160 on the respective first and second side wall 1062 of the first housing portion 1150. Similarly, the coupling groove 1164 extending from the first wall 1054 is configured to receive the flange 1160 of the partition wall 1162. Each of the first and second side walls 1062 include fins 1172 (or other heat dissipating members) extending therefrom.

A third side wall 1062 of the box-like structure of the charger electronics housing 1008 is coupled (e.g., by fasteners and the like) between the first and second walls 1054, 1058 and the first and second side walls 1054, 1058. The third side wall 1062 defines an aperture extending 1176 therethrough. A fourth side wall 1062 of the box-like structure of the charger electronics housing 1008 is coupled (e.g., by fasteners and the like) between the first and second walls 1054, 1058 and the first and second side walls 1062. The fourth side wall 1062 includes a plurality of vent holes 1180 extending therethrough. The partition wall 1162 extends between the third and fourth side walls 1062 of the charger electronics housing 1000.

An interior of the charge electronics housing 1008 is divided into a first portion 1190 and a second portion 1194 by the partition wall 1162. The partition wall 1162 ensures that the first portion 1190 and the second portion 1194 are separated from one another. The first portion 1190 is completely enclosed by the partition wall 1162 and the other walls 1054, 1058, 1062 of the box-like structure of the charger electronics housing 1008. The charger electronics 1050 are positioned in the first portion 1190 and a potting compound fills the first portion. In the construction of FIG. 29, an auxiliary plate 1198 (e.g., aluminum or other metal plate) may support at least a portion of the charger electronics 1050 and be positioned adjacent to and in thermal communication with the partition wall 1162.

The second portion 1194 is enclosed by the partition wall 1162 and the other walls 1054, 1058, 1062 of the box-like structure of the charger electronics housing 1008. The aperture 1176 of the third side wall 1062 is positioned to be in communication and aligned with the second portion 1194 and accommodates the fan 1004, which is positioned within the second portion 1194. The plurality of vent holes 1180 of the fourth side wall 1062 is positioned to be in communication with the second portion 1194 such that the plurality of vent holes 1180 is positioned on the opposite side of the charger electronics housing 1008 from the fan 1004. In the illustrated construction, the partition wall 1162 includes fins 1202 that extend therefrom into the second portion 1194.

The charger electronics housing 1008 is positioned within the cover 1000 and between the cover 1000 and battery pack receiving portion 750 such that the fan 1004 is positioned adjacent the first or second plurality of vent holes 1032, 1036 and the plurality of vent holes 1180 in the charger electronics housing 1008 is positioned adjacent the other of the first and second plurality of vent holes 1032, 1036. A cooling air passage 1206 is defined between the first or second plurality of vent holes 1032, 1036 in the cover 1000, the fan 1004, the plurality of vent holes 1180 in the charger electronics housing 1008, and the other of the first or second plurality of vent holes 1032, 1036.

Regardless of the construction of the charger electronics portion 754, airflow through the battery pack receiving portion 750 remains the same, as discussed with respect to FIG. 26 above. However, as shown in FIG. 31, using the charger electronics portions 754 of either of FIG. 28 or 29 allows cooling air to flow between opposite sides thereof. In particular, the fan 1004 and cooling air passage 1140, 1206 of the charger electronics portions 754 of both FIGS. 28 and 29 are operable to cool the charger electronics housing 1008 and dissipate heat therefrom. In the illustrated construction, each of the fans 1004 suck ambient air from an area adjacent the first or second plurality of vent holes 1032, 1036 (depending on which the fan 1004 is positioned at or adjacent to) into the charger electronics portion 754 via the respective first or second plurality of vent holes 1032, 1036 and expel the air through the opposite first or second plurality of vent holes 1032, 1036. With respect to FIG. 28 specifically, the fan 1004 sucks ambient air from an area adjacent the first or second plurality of vent holes 1032, 1036 (depending on which the fan 1004 is positioned at or adjacent to) into the charger electronics portion 754 via the respective first or second plurality of vent holes 1032, 1036 (depending on which the second end 1112 of the air channel 1104 is positioned at or adjacent to) and expels the air through the opposite first or second plurality of vent holes 1032, 1036 such that cooling air moves through the air channel 1104. With respect to FIG. 29 specifically, the fan 1004 sucks ambient air from an area adjacent the first or second plurality of vent holes 1032, 1036 (depending on which the fan 1004 is positioned at or adjacent to) into the charger electronics portion 754 via the respective first or second plurality of vent holes 1032, 1036 (depending on which plurality of vent holes 1180 in the charger housing 1008 is positioned at or adjacent to) and expels the air through the opposite first or second plurality of vent holes 1032, 1036 such that cooling air moves through the second portion 1194 of the charger electronics housing 1008. Regardless, in each of the embodiments of FIGS. 28 and 29, the cooling air passage guides cooling air along an axis M, which is oriented at a non-parallel angle relative to the insertion axis K. In the illustrated constructions, the axis M is oriented at a perpendicular angle to the insertion axis K.

In the illustrated constructions of FIGS. 19-31, each of the fans 918, 1004 is a multi-speed fan operable to rotate at more than one speed. The speed at which each of the fans 918, 1004 rotates may be determined based on a temperature of one or more of the charger electronics 1050 or the battery pack 614. In some constructions, at full speed, the fans 918, 1004 generate an air flow of between about 13.6 m3/hour and about 25.5 m3/hour. Still further, in some constructions, the fans 918, 1004 may generate an air flow of about 20.4 cubic feet per minute (CFM) and up to about 35 m3/hour or less. In still other constructions, at full speed, the fans 918, 1004 may generate an air flow that is less than or greater than 31 CFM. For example, the fans 918, 1004 may use 31.64 CFM/amp on each cell in an unloaded condition.

The constructions discussed herein are configured to move air through the respective charger and the battery pack. Other constructions may be configured to move other cooling fluids through the respective charger and battery pack.

Although the disclosure has been described with reference to certain preferred aspects, variations and modifications exist within the scope and spirit of one or more independent aspects of the disclosure as described. Various features and advantages of the disclosure are set forth in the following claims.

What is claimed is:

1. A charger comprising:
   a housing including a front wall, a rear wall, a top wall, a bottom wall, a first side wall, and a second side wall;
   an interface positioned in the front wall and configured to engage a battery pack, the interface including charging terminals positioned between a first rail and a second rail, a first groove positioned between the first rail and a wall of the housing, and a second groove positioned between the second rail and the wall of the housing, the interface being in communication with an interior of the housing;
   a fan coupled within the housing; and
   an air passage member including a hollow body that has a first end and a second end spaced apart from the first end, the first end being coupled to the fan and the second end being in communication with outside of the housing through one of the walls; and
   wherein the fan is operable to suck an air flow into the housing from outside the housing and guide the air flow through the air passage member to the battery pack interface.

2. The charger of claim 1, wherein the second end of the air passage member is in communication with outside of the housing through the rear wall of the housing.

3. The charger of claim 2, wherein the housing defines a depth between the front wall and the rear wall, the air passage member having a length that is at least 50% of the depth.

4. The charger of claim 1, wherein the air passage member includes a first axis that is oriented at a first axis relative to an insertion axis defined by the interface and a second axis that is oriented at a non-perpendicular and non-parallel angle relative to the first axis.

5. The charger of claim 1, wherein each of the first rail and the second rail includes an aperture extending therethrough.

6. A charger comprising:
   a housing;
   charger electronics positioned within the housing;
   an interface positioned in a first wall of the housing and configured to engage a battery pack, the interface including charging terminals positioned between a first rail and a second rail, a first groove positioned between the first rail and the first wall of the housing, and a second groove positioned between the second rail and the first wall of the housing, the interface being in communication with an interior of the housing, the charging terminals being in electrical communication with the charger electronics;
   a first fan in communication with the interface, the first fan being positioned between the first wall and the second wall;
   an air passage guide that has a first end and a second end spaced apart from the first end, the first end in communication with the fan and the second end in communication with outside of the housing through through a second wall, the first fan being operable to suck a first air flow into the housing from outside the housing and guide the first air flow through the air passage guide to the interface; and
   a second fan positioned within the housing and operable to suck a second air flow into the housing from outside the housing such that the second air flow moves through the housing to cool the charger electronics.

7. The charger of claim 6, wherein the first fan is positioned closer to a front of the housing than the second fan.

8. The charger of claim 6, wherein the first air flow and the second air flow are separate.

9. The charger of claim 6, wherein each of the rails include an aperture that is in communication with the air passage guide.

10. The charger of claim 6, wherein the housing further includes a heat sink that is in a heat transfer relationship with components of the charger electronics.

11. The charger of claim 6, wherein the first fan is adjacent a front of the housing.

12. The charger of claim 6, further comprising a second interface supported by the housing and configured to engage a second battery pack, the second interface including charging terminals that are in electrical communication with the charger electronics.

13. A charger for charging a battery pack having a housing enclosing a plurality of battery cells and one or more vent holes, the charger comprising:
   a housing including a battery pack receiving portion and a separate charger electronics portion, the charger electronics portion including a charger electronics enclosure;
   a battery pack interface supported on the battery pack receiving portion, the battery pack interface including charging terminals;
   a first cooling air passage extending though the battery pack receiving portion;
   a first fan positioned in the battery pack receiving portion and operable to move air from outside of the battery pack receiving portion into the first cooling air passage; and
   a printed circuit board including electrical components in electrical communication with the charging terminals, the printed circuit board enclosed within charger electronics enclosure;
   a second cooling air passage extending through the charger electronics portion and being in fluid communication with the charger electronics enclosure for removing heat generated by the electrical components and sealed from the first cooling air passage; and
   a second fan positioned in the charger electronics portion outside the charger electronics enclosure and operable to move air from outside charger electronics portion into the second cooling air passage.

14. The charger of claim 13, wherein the first fan is operable to suck the cooling air into the first cooling air passage member from outside the battery pack receiving portion and guide the air to the interior of the battery pack.

15. The charger of claim 13, wherein the charger electronics enclosure is formed at least partially form a metal material such that the charger electronics enclosure is a heat sink.

16. The charger of claim 13, wherein the battery pack interface defines an insertion axis for the battery pack, a first rail parallel to the insertion axis, and a second rail positioned opposite the first rail and parallel to the insertion axis, and wherein an axis of rotation of the first fan is perpendicular to the insertion axis.

17. The charger of claim 16, wherein the first fan is positioned adjacent one of the first rail or the second rail.

18. The charger of claim 16, wherein the first fan is positioned adjacent to the first rail, and further comprising a third fan positioned adjacent to the second rail, an axis of rotation of the third fan being perpendicular to the insertion axis.

19. The charger of claim 13, wherein the housing includes a handle, the battery pack receiving portion being positioned between the charger electronics portion and the handle.

20. The charger of claim 13, further comprising a heating or cooling member positioned within the first passage.

* * * * *